(12) United States Patent
Oyama et al.

(10) Patent No.: US 10,343,513 B2
(45) Date of Patent: Jul. 9, 2019

(54) WORK VEHICLE

(71) Applicant: Kubota Corporation, Osaka-shi (JP)

(72) Inventors: Yoshinori Oyama, Sakai (JP);
Kimihiro Kai, Sakai (JP); Hiroshi Takagi, Sakai (JP); Toshiki Ono, Sakai (JP); Kohta Nakao, Sakai (JP); Takafumi Komatsu, Sakai (JP); Kensuke Okabe, Sakai (JP); Yuki Nakaoka, Sakai (JP)

(73) Assignee: Kubota Corporation, Osaka (JP)

(*) Notice: Subject to any disclaimer, the term of this patent is extended or adjusted under 35 U.S.C. 154(b) by 18 days.

(21) Appl. No.: 15/830,185

(22) Filed: Dec. 4, 2017

(65) Prior Publication Data
US 2018/0154765 A1    Jun. 7, 2018

(30) Foreign Application Priority Data

Dec. 5, 2016  (JP) .................................. 2016-236035
Feb. 28, 2017  (JP) .................................. 2017-036534
(Continued)

(51) Int. Cl.
*B60K 13/04* (2006.01)
*F01N 13/18* (2010.01)
(Continued)

(52) U.S. Cl.
CPC ................ *B60K 13/04* (2013.01); *B60K 5/12* (2013.01); *B60K 17/00* (2013.01);
(Continued)

(58) Field of Classification Search
CPC . B60K 13/04; F01N 2340/02; F01N 2340/04; F01N 13/082; F01N 13/1805; F01N 13/1822; F01N 13/1811
See application file for complete search history.

(56) References Cited

U.S. PATENT DOCUMENTS

| | | | |
|---|---|---|---|
| 4,907,743 A * | 3/1990 | Bouiller | F02K 1/04 239/265.11 |
| 5,921,080 A * | 7/1999 | Ulmet | F01N 3/28 60/302 |

(Continued)

FOREIGN PATENT DOCUMENTS

| | | | |
|---|---|---|---|
| JP | 2007321850 A | 12/2007 | |
| JP | 200912677 A | 1/2009 | |

(Continued)

*Primary Examiner* — James A Shriver, II
*Assistant Examiner* — Vaughn Coolman
(74) *Attorney, Agent, or Firm* — The Webb Law Firm

(57) ABSTRACT

A work vehicle is disclosed that includes an elastic support mechanism for supporting an exhaust muffler. The elastic support mechanism includes a support platform member, an elastic cylindrical members and an bar-shaped member. The support platform member is supported by a rear-linking frame bar to adjust a position of the support platform member along one of lateral and longitudinal directions of the body frame. An elastic cylindrical member supported by one of the support platform member and the exhaust muffler. The elastic cylindrical member has an axis extending along the other of the lateral and longitudinal directions, and is supported at a single position, in a direction of the axis, of said one of the support platform member and the exhaust muffler. A bar-shaped member supported by the other of the support platform member and the exhaust muffler is fitted into the elastic cylindrical member to be supported by the elastic cylindrical member.

4 Claims, 21 Drawing Sheets

(30) Foreign Application Priority Data

May 25, 2017 (JP) ................................ 2017-103418
Jun. 1, 2017 (JP) ................................ 2017-109384

(51) Int. Cl.

| | | |
|---|---|---|
| *B60K 5/12* | (2006.01) | |
| *B60K 17/00* | (2006.01) | |
| *F16D 55/00* | (2006.01) | |
| *F16D 65/00* | (2006.01) | |
| *F16D 121/00* | (2012.01) | |
| *F16D 55/2265* | (2006.01) | |
| *F16D 121/04* | (2012.01) | |
| *F16D 121/14* | (2012.01) | |
| *F16D 123/00* | (2012.01) | |

(52) U.S. Cl.

CPC ...... *F01N 13/1822* (2013.01); *F01N 2590/08* (2013.01); *F16D 55/2265* (2013.01); *F16D 65/0056* (2013.01); *F16D 65/0068* (2013.01); *F16D 65/0081* (2013.01); *F16D 2055/0037* (2013.01); *F16D 2121/04* (2013.01); *F16D 2121/14* (2013.01); *F16D 2123/00* (2013.01)

(56) References Cited

U.S. PATENT DOCUMENTS

| | | | | |
|---|---|---|---|---|
| 7,624,956 B2 * | 12/2009 | Steigert | ................... | F01N 13/10 180/309 |
| 7,644,911 B2 * | 1/2010 | Rodecker | ............ | A61M 35/003 267/140.12 |
| 8,074,756 B2 * | 12/2011 | Kusaka | ................... | B62K 5/01 180/225 |
| 8,366,069 B2 * | 2/2013 | Rodecker | ............ | F01N 13/1805 180/296 |
| 8,381,865 B2 * | 2/2013 | Okada | ................... | E02F 9/0866 180/296 |
| 8,646,761 B2 * | 2/2014 | Rodecker | ............ | F01N 13/1811 180/296 |
| 8,875,500 B2 * | 11/2014 | Bednarz | ................ | E02F 9/0866 248/201 |
| 9,238,989 B2 * | 1/2016 | Tsuchihashi | ........... | B60K 13/04 |
| 9,358,876 B2 * | 6/2016 | Hanashima | ............. | F01N 13/08 |
| 9,506,393 B2 * | 11/2016 | Fujita | ..................... | F01N 1/083 |
| 9,605,582 B1 * | 3/2017 | Lee | ..................... | F01N 13/1822 |
| 9,790,837 B2 * | 10/2017 | Adamson | ............ | F01N 13/1805 |
| 9,845,720 B2 * | 12/2017 | Rodecker | ................ | F01N 13/16 |
| 2005/0184201 A1 * | 8/2005 | Komitsu | ................ | B60K 13/04 248/58 |
| 2007/0290551 A1 | 12/2007 | Fujimoto et al. | | |
| 2011/0240827 A1 * | 10/2011 | Malloy | ............... | F01N 13/1822 248/636 |
| 2012/0055729 A1 * | 3/2012 | Bessho | .................... | B60K 5/04 180/309 |
| 2013/0047568 A1 | 2/2013 | Yamada et al. | | |
| 2014/0113766 A1 | 4/2014 | Yagyu et al. | | |
| 2016/0200187 A1 * | 7/2016 | Kim | ........................ | B60K 5/12 180/309 |
| 2017/0001549 A1 | 1/2017 | Bessho et al. | | |
| 2017/0211458 A1 * | 7/2017 | Rodecker | ............ | F01N 13/1822 |
| 2017/0246942 A1 * | 8/2017 | Takaki | ..................... | B60K 1/04 |

FOREIGN PATENT DOCUMENTS

| | | |
|---|---|---|
| JP | 201342717 A | 3/2013 |
| JP | 2014133489 A | 7/2014 |
| JP | 201713686 A | 1/2017 |

* cited by examiner

WORK VEHICLE

CROSS-REFERENCE TO RELATED APPLICATIONS

This application claims priority to Japanese Patent Application Nos. 2016-236035, 2017-036534, 2017-103418, and 2017-109384, filed Dec. 5, 2016, Feb. 28, 2017, May 25, 2017, and Jun. 1, 2017, respectively, the disclosures of which are hereby incorporated in their entirety by reference.

BACKGROUND OF THE INVENTION

1. Field of the Invention

The present invention relates to work vehicles, such as multi-purpose vehicles (referred also to as utility vehicles), used in a variety of applications, such as transportation of various equipment and materials as well as recreations.

2. Description of the Related Art

(1) First Related Art

The work vehicle disclosed in JP 2014-133489A or its corresponding application US 2014/0113766A1 comprises an elastic support mechanism interposed between a support structure provided on a body frame and an exhaust muffler associated with the engine so as to support the exhaust muffler on the support structure. The elastic support mechanism is configured so that a silencer can be supported by the side frames via mount rubbers located at four positions at right/left side edges (two at the front end and two at the rear end) of the silencer.

Specifically, at the front end of the right/left side edges, vehicle-side support pins of the vehicle-side brackets mounted on the side frames are inserted inwardly from the outside into pin holes formed in the upper portions of the mount rubbers while silencer-side support pins of the silencer-side brackets mounted on the silencer are inserted outwardly from the inside into pin holes formed in the lower portions of the mount rubbers. In this way, the front end of both side edges of the silencer can be elastically supported by the right/left side frames via a pair of right/left mount rubbers.

At the rear end of the right/left side edges, vehicle-side support pins of the vehicle-side bracket mounted on the side frames are inserted rearward from the vehicle front side into pin holes formed in the upper portions of the mount rubbers while silencer-side support pins of the silencer-side bracket mounted on the silencer are inserted forward from the vehicle rear side into pin holes formed in the lower portions of the mount rubbers. In this way, the rear end of both side edges of the silencer can be elastically supported by the right/left side frames via a pair of right/left mount rubbers.

As the exhaust muffler is rigidly connected to the engine via the exhaust pipe, the position or the posture of the exhaust muffler relative to the support structure may undergo change depending on the product error or assembly error of the body frame or the exhaust pipe.

If the conventional elastic support technique is employed, the elastic support mechanism may support the exhaust muffler while an undue stress is applied to the elastic members if a large change has occurred in the position or the posture of the exhaust muffler relative to the support structure. This may result in a reduced ability to absorb the relative vibration between the support structure and the exhaust muffler.

In view of the above, it is desired to provide a work vehicle that can favorably absorb the relative vibration between the exhaust muffler and the support structure at a low cost regardless of the position or the posture of the exhaust muffler relative to the support structure

(2) Second Related Art

In the work vehicle disclosed in JP 2007-321850A or its corresponding application US 2007/0290551A1, each of the rear wheel disc brakes has a plurality of brake friction plates contained in an outer case in which hydraulic braking operation is performed. On the other hand, each of the front wheel disc brakes is also disposed inside a disc wheel while the brake disc and the calipers are not contained in an outer case.

On the front wheel side, where steering is performed, it is preferred that the disc brakes are compactly contained in the disc wheels. Accordingly, it has been difficult to accommodate the entire disc brakes in cases as this tends to enlarge the cases. This in turn makes it difficult to prevent pebbles and weed from being lodged between the disc rotor and the calipers of the disk brakes on the front wheel side.

In view of the above, it is desired to provide a work vehicle fitted with a brake system that provides solution to the above-described problems.

SUMMARY OF THE INVENTION (1) In view of the first related art, there is proposed a work vehicle as under:
A work vehicle, comprising:
a body frame;
an engine;
an exhaust muffler associated with the engine;
a support structure provided in the body frame for supporting the engine; and
an elastic support mechanism interposed between the support structure and the exhaust muffler for supporting the exhaust muffler on the support structure, the elastic support mechanism including:
  a support platform member supported by the support structure, the support platform member being configured to adjust a position of the support platform member along one of lateral and longitudinal directions of the body frame,
  an elastic cylindrical member supported by one of the support platform member and the exhaust muffler, the elastic cylindrical member having an axis extending along the other of the lateral and longitudinal directions, and the elastic cylindrical member being supported at a single position, in a direction of said axis, of said one of the support platform member and the exhaust muffler, and
  a bar-shaped member supported by the other of the support platform member and the exhaust muffler, the bar-shaped member being fitted into the elastic cylindrical member to be supported by the elastic cylindrical member.

According to this implementation, by adjusting a position of the support platform member relative to the support structure, the elastic cylindrical members and the bar-shaped members can be moved together with the support platform member relative to the support structure in the lateral widthwise or longitudinal direction of the body frame. This allows the mounting position of the exhaust muffler to be adjusted relative to the support structure in the lateral widthwise or longitudinal direction of the body frame. By moving the exhaust muffler along the axes of the cylinders, the bar-shaped members and the elastic cylindrical members are moved along the axes of the cylinders so as to move the exhaust muffler along the axes of the cylinders relative to the support platform member. This allows the mounting position of the exhaust muffler to be adjusted relative to the support structure in the other of the lateral and longitudinal directions of the body frame than the one associated with the adjustment of the position of the support platform member.

As the elastic cylindrical members are arranged at a single position in the axial direction of the cylinders, by vertically swinging the exhaust muffler, the bar-shaped members cause elastic deformation of the elastic cylindrical members so as to vertically tilt the bar-shaped members and the elastic cylindrical members relative to the support platform member. This allows the mounting posture of the exhaust muffler to be vertically tiltably adjusted relative to the support structure.

The foregoing simple configuration allows the mounting position of the exhaust muffler to be adjusted relative to the support structure in the lateral and longitudinal directions of the body frame and also allows the mounting posture of the exhaust muffler to be vertically tiltably adjusted relative to the support structure.

Accordingly, even if the position or the posture of the exhaust muffler changes relative to the support structure, by enabling the adjustment of the mounting position and the mounting posture of the exhaust muffler relative to the support structure, the elastic support mechanism can be interposed between the exhaust muffler and the support structure without applying an undue stress to the elastic cylindrical members. Accordingly, the elastic cylindrical members can effectively absorb the relative vibration between the support structure and the exhaust muffler while this configuration can be provided at a low cost.

In a preferred embodiment, the elastic cylindrical members are supported by the support platform member while the bar-shaped members are supported by the exhaust muffler. According to this configuration, as compared to the case in which elastic cylindrical members are supported by an exhaust muffler, the exhaust muffler can be made more compact as it needs only to support the bar-shaped members, thus facilitating the handling of the exhaust muffler.

In a preferred embodiment, a pair of elastic cylindrical members is lined up in said one of the lateral and longitudinal directions, and a pair of bar-shaped members is individually inserted and fitted in the pair of elastic cylindrical members in the same direction. According to this configuration, as the support platform member can stably support the exhaust muffler at two points, and the pair of bar-shaped members is individually inserted into the pair of elastic cylindrical members in the same direction, the exhaust muffler can be easily assembled to the support platform member so as to be supported thereby.

In another preferred embodiment, the work vehicle further comprises:
a travel mechanism;
an exhaust pipe connecting the engine and the exhaust muffler; and
a transmission for transmitting power of the engine to the travel mechanism,
wherein the body frame includes a first body frame section and a second body frame section detachably attached to the first body frame section, the second body frame section supporting the engine, the exhaust pipe, and the transmission, and
the support structure constitutes the second body frame section.

According to this configuration, the engine, the exhaust muffler, the exhaust pipe, and the transmission can be made to be supported by the second body frame section before the second body frame section is connected to the first body frame section in advance, and the elastic support mechanism can be adjusted to allow the elastic cylindrical members to effectively absorb vibration. Subsequently, by coupling the first body frame section to the second body frame section to assemble the body frame, the engine, the exhaust muffler, the exhaust pipe, and the transmission can be mounted to the body frame all at once.

(2) In view of the second related art, there is proposed a work vehicle as under:
A brake system for a work vehicle, comprising:
a disc rotor rotatable in unison with a wheel support hub of the work vehicle;
a caliper for applying a braking force to both sides of the disc rotor; and
a cover body provided in an inner area of a vehicle body on a side of the disc rotor opposite to the wheel support hub, the cover body covering one of both sides of the disc rotor that faces the inner area.

According to this configuration, the cover body for covering the side of the disc rotor facing inward in the vehicle body is provided at a position located on the vehicle interior side relative to the disk rotor, that is, on a side opposite to the wheel support hub. This can minimize the possibility for pebbles, weed, etc., to enter the area where the disc rotor is located from inside the vehicle.

This advantageously avoids upsizing of the entire disc brake and lowers the possibility for pebbles and weed from being lodged between the disc rotor and the caliper with a simple structure.

In still another preferred embodiment, the caliper is provided on a portion of an outer circumference of the disc rotor, and the cover body is provided approximately all around the outer circumference of the disc rotor, except for a portion of the outer circumference on which the caliper is provided.

This configuration can further reduce the possibility for pebbles and weed to be lodged between the disc rotor and the caliper without any trouble whether the front wheels are rotating forward or rearward.

In yet another preferred embodiment, the calipers and the cover body are fixed to different locations on an axle support on which the wheel support hub is mounted.

According to this configuration, the cover body can be mounted and removed without having to mount and remove the caliper to facilitate the maintenance and cleaning thereof.

In one preferred embodiment, the cover body includes a vertical wall surface opposing said one of both sides of the disc rotor and a circumferential wall surface opposing an outer circumferential surface of the disc rotor. Additionally, a circumferential length of the circumferential wall surface is formed shorter than a circumferential length of the outer circumference of the vertical wall surface, and predetermined intervals are created circumferentially between circumferential edges of the circumferential wall surface and circumferential edges of the caliper.

This configuration can more effectively prevent pebbles, weed, etc., from entering the area where the disc rotor is located. Moreover, the circumferential wall surface is formed to have a circumferential length shorter than the circumferential length of the outer circumference of the vertical wall surface, and predetermined circumferential intervals between the circumferential edges of the circumferential wall surface and the circumferential edges of the caliper. Therefore, the frictional heat generated from the disc rotor and the caliper can be dissipated via the predetermined intervals so as to facilitate the heat dissipation therefrom without substantially affecting the function of minimizing the entry of pebbles and weed.

Other features and the advantages provided by these features will be more clearly understood by reading the following description with reference to the attached drawings:

BRIEF DESCRIPTION OF THE DRAWINGS

FIGS. 1-7 show a first embodiment of the invention, in which:

FIG. 1 is a left side of an entire work vehicle (a multi-purpose vehicle is shown as an example thereof in each of the illustrated embodiments in FIGS. 1 to 27);

FIG. 2 is a left side view of a body frame;

FIG. 3 is a left side view of an engine unit;

FIG. 4 is a plan view of the engine unit;

FIG. 5 is a rear view of the engine unit;

FIG. 6 is a side view of an elastic support mechanism; and

FIG. 7 is a rear view of the elastic support mechanism;

FIGS. 8 to 14 show a second embodiment, in which:

FIG. 8 is a left side view of an entire work vehicle;

FIG. 9 is a partially cutaway front view of a brake system and a cover body mounted to a disc wheel;

FIG. 10 is a perspective view of the brake system and the cover body;

FIG. 11 is a plan view of the brake system and the cover body;

FIG. 12 is a perspective view of the brake system and the cover body;

FIG. 13 is an exploded perspective view of the brake system and the cover body; and FIG. 14 is a partially cutaway front view of a brake system and a cover body mounted to a disc wheel according to a modified embodiment;

FIGS. 15 to 19 show a third embodiment, in which:

FIG. 15 shows a side view of an entire work vehicle;

FIG. 16 is a plan view of the work vehicle;

FIG. 17 is a plan view of longitudinal frame members;

FIG. 18 is a perspective view showing lower rear frames; and

FIG. 19 is a plan view of a reinforcing plate; and

FIGS. 20 to 27 show a fourth embodiment, in which:

FIG. 20 is a view of a fourth embodiment of the present invention, showing an entire left side of a work vehicle;

FIG. 21 is a side view of the operating structure of a differential lock device and a parking brake;

FIG. 22 is a perspective view of a first interlocking member, a second interlocking member and a coil spring; and FIG. 23-27 are views in section explaining assembly of the coil spring sequentially.

DETAILED DESCRIPTION OF PREFERRED EMBODIMENTS

Figure 1:
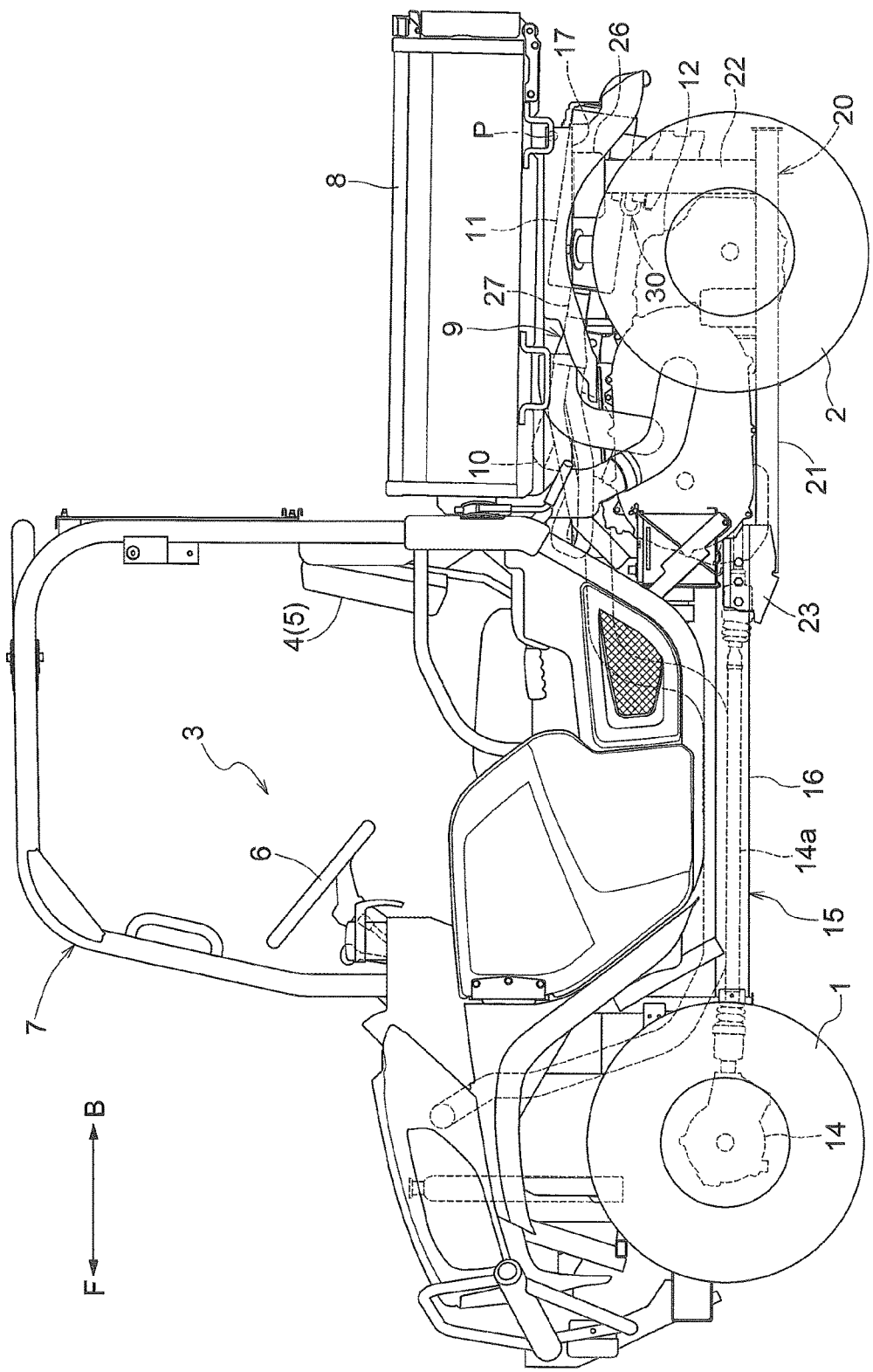

Unless explicitated otherwise, in embodiments to be described as follow, directions indicated with letters "F" and "B" in FIG. 1 refer to forward and backward (rearward) directions of a traveling vehicle body ("vehicle body"), respectively. Directions indicated with letters "R" and "L" in FIG. 16 refer to right/left directions of the vehicle body, respectively (i.e. directions toward front and back sides of FIG. 1).

First Embodiment

Overall Configuration of Multi-Purpose Vehicle

FIG. 1 shows a multi-purpose vehicle that includes a traveling vehicle body including a pair of right/left steerable and drivable front wheels 1 and a pair of right/left drivable rear wheels 2. A driver section 3 is formed in the longitudinal center of the traveling vehicle body. The driver section 3 includes a driver seat 4, a passenger seat 5 and a steering wheel 6. The driver section 3 is enclosed by a protective frame 7. The passenger seat 5 is disposed on one side of the driver seat 4. The steering wheel 6 is disposed to be rotatably operable in front of the driver seat 4 and linked to an un-illustrated steering operation unit of the front wheels 1 so that the front wheels 1 can be steered by rotating the steering wheel 6. A load-carrying platform 8 ("platform 8" hereinafter) is provided rearward of the driver section 3 in the traveling vehicle body. The platform 8 is supported to be pivotally raised/lowered about an axis P of the laterally extending support shaft, between a loading position in which the platform 8 is oriented horizontal along the longitudinal direction of the traveling vehicle body, and a damping position in which the platform 8 is tilted with the front end thereof raised and the rear end thereof lowered. The platform 8 is raised and lowered by the operation of a hydraulic actuator (not shown). A drive section 9 is provided below the platform 8 in the traveling vehicle body. The drive section 9 includes an engine 10, an engine exhaust muffler 11 and a transmission 12. The power from the engine 10 is transmitted to the transmission 12, and then transmitted to the right/left rear wheels 2 from the right/left rear wheel drive shafts 2a, and to a front wheel drive case 14 from a front wheel output shaft 13 via a rotational shaft 14a.

Configuration of Traveling Vehicle Body

Figure 3:
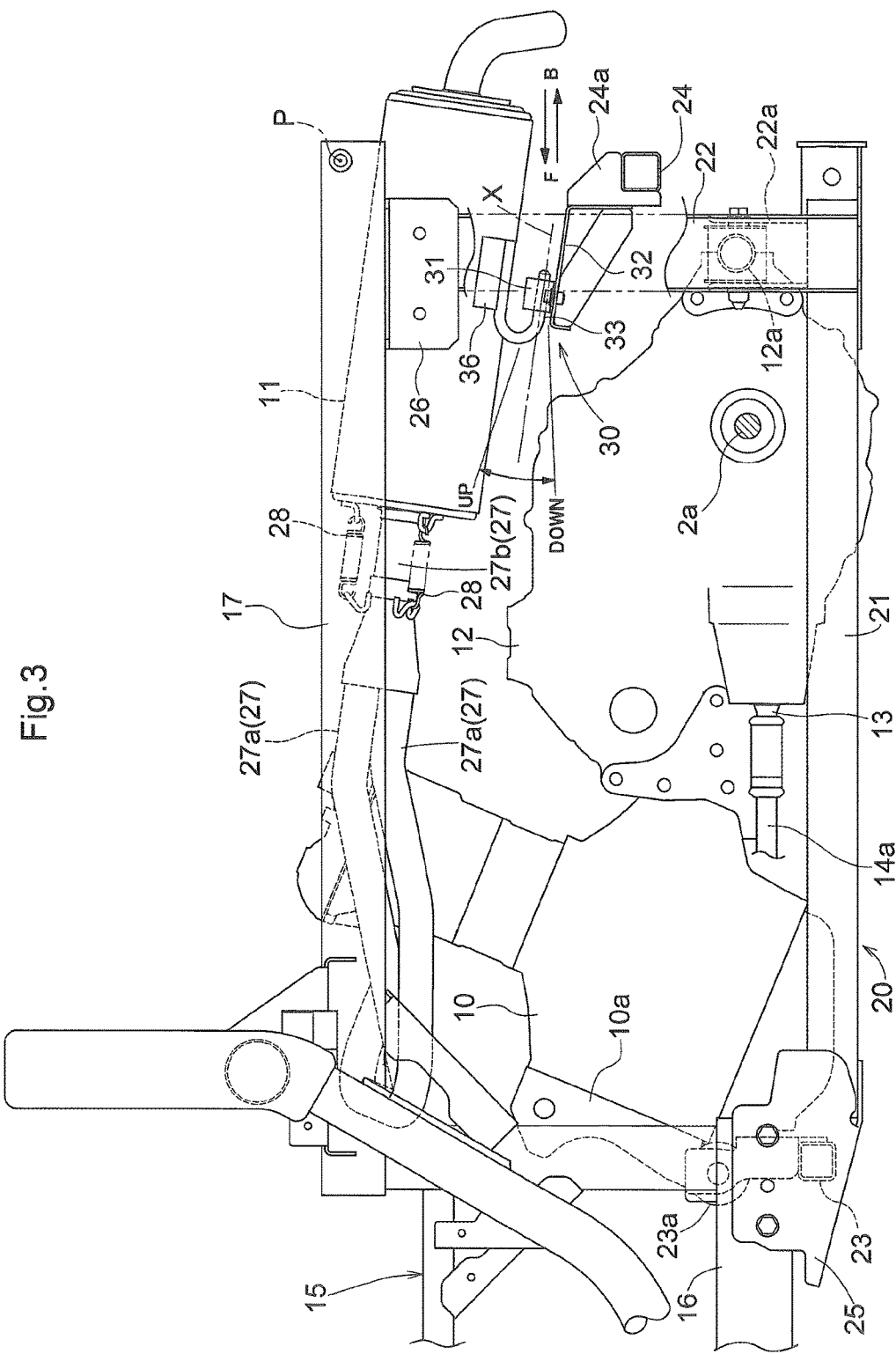
Figure 4:
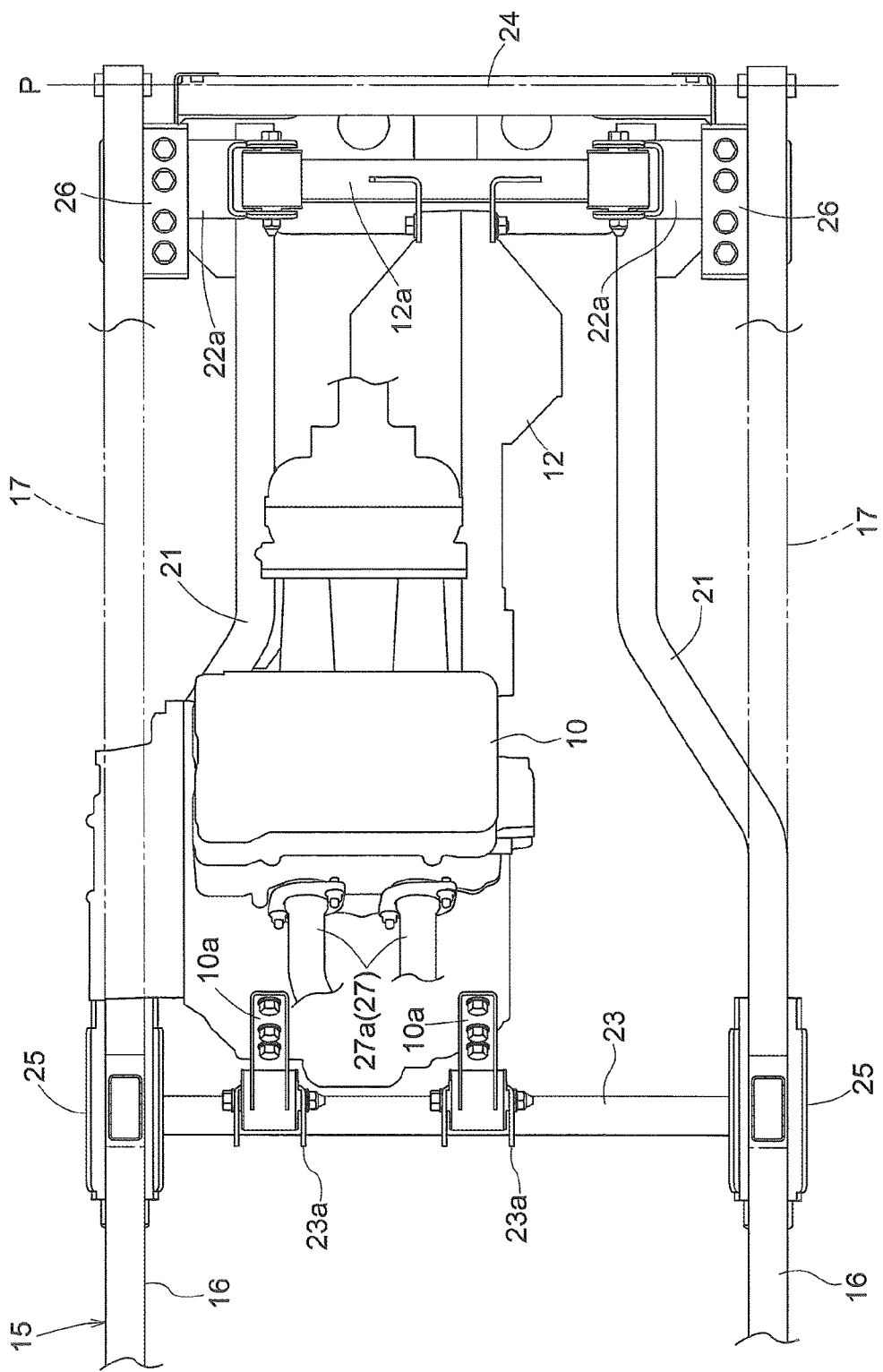
Figure 5:
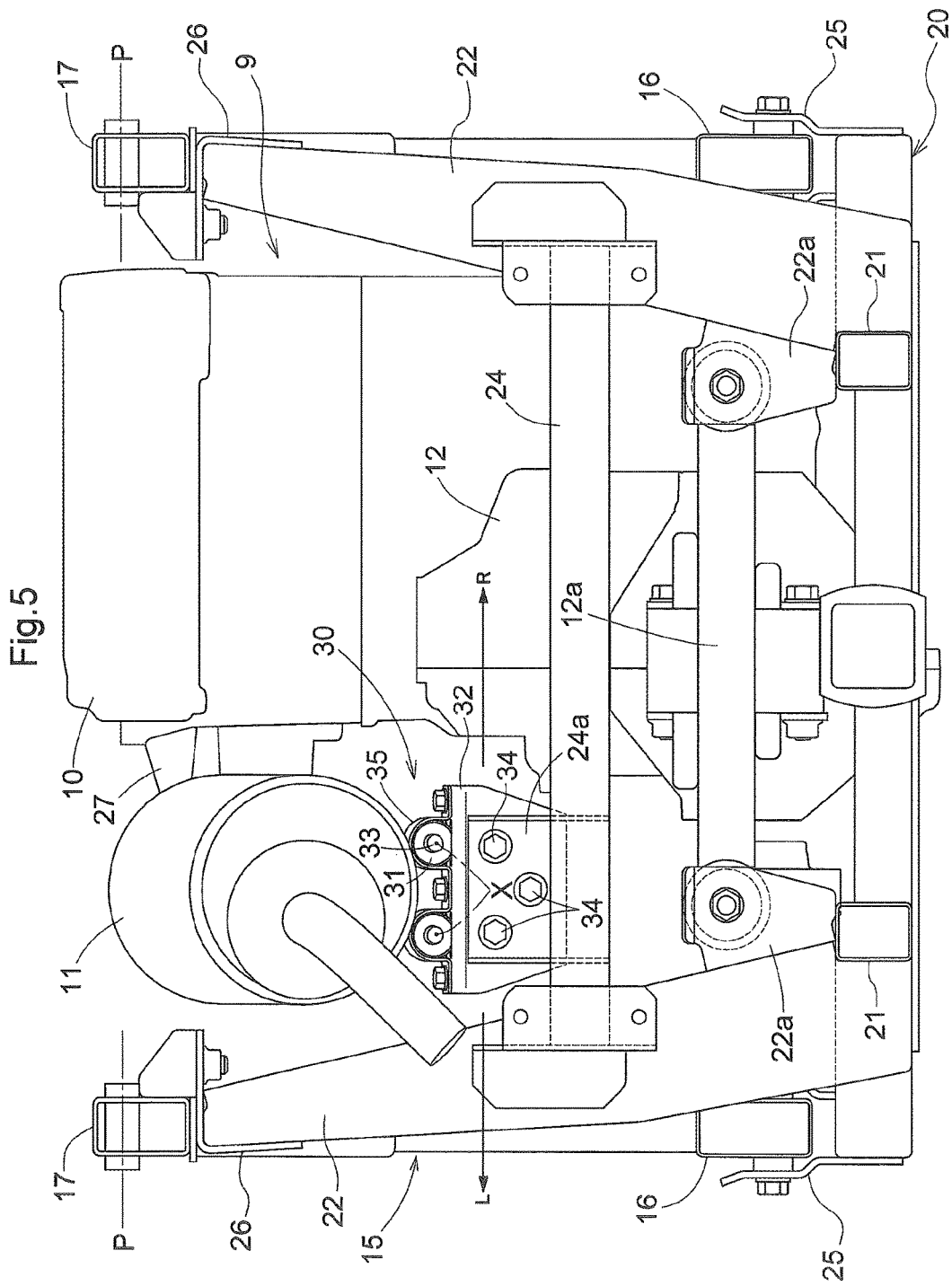
Figure 6:
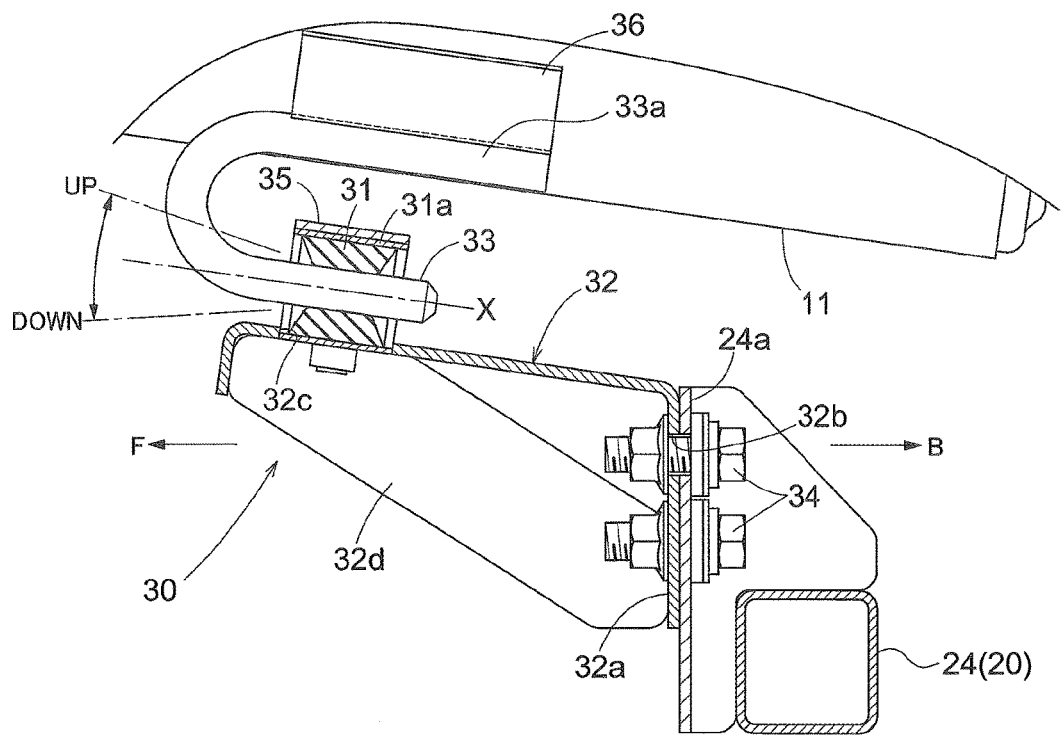
Figure 7:
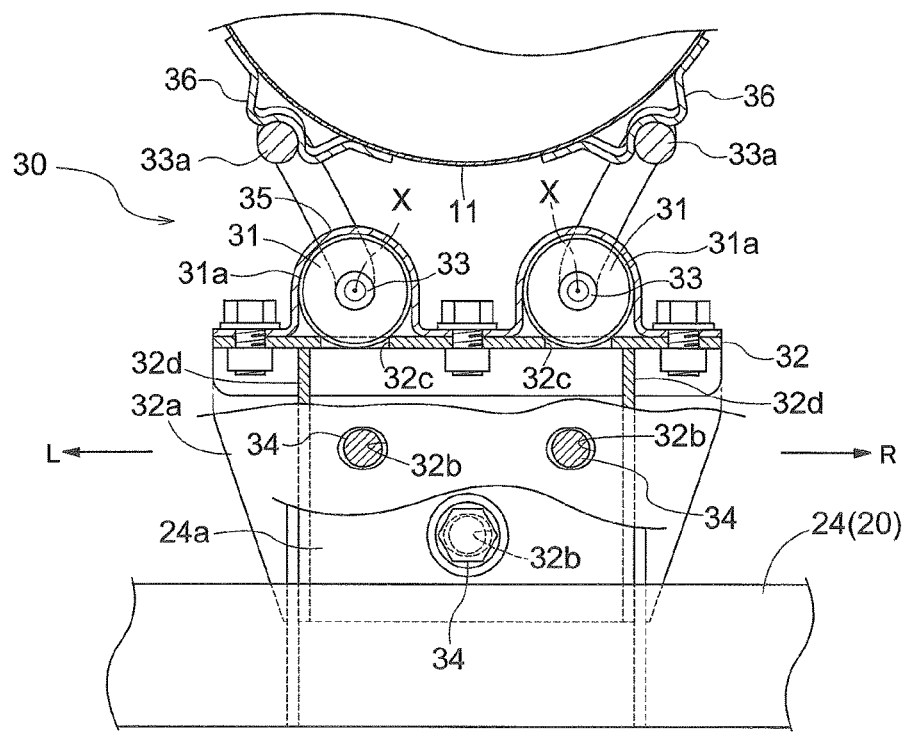

As shown in FIGS. 3 to 5, a support structure 20 includes a pair of right/left longitudinal frame bars 21 extending in the longitudinal direction of the traveling vehicle body, a pair of right/left vertical frame bars 22 extending in the vertical direction of the traveling vehicle body, a front-linking frame bar 23 extending in the lateral direction of the traveling vehicle body, and a rear-linking frame bar 24 extending in the lateral direction of the traveling vehicle body. The engine 10, the transmission 12, the exhaust muffler 11, and an exhaust pipe 27 interconnecting the engine 10 and the exhaust muffler 11 are all supported by the same support structure 20 to form an engine unit, in more detail to follow.

The front-linking frame bar 23 interconnects the front ends of the right/left longitudinal frame bars 21. The rear-linking frame bar 24 interconnects intermediate portions of the right/left vertical frame bars 22. The exhaust pipe 27 includes two engine-side exhaust pipes 27a, and a muffler-side exhaust pipe 27b that merges the two engine-side exhaust pipes 27a to be connected to the exhaust muffler 11. The muffler-side exhaust pipe 27b is press-connected to the inlet of the exhaust muffler 11 by springs 28.

As shown in FIGS. 3 to 5, the engine 10 is connected to the transmission 12 by connecting the output portion of the engine 10 and the input portion of the transmission 12. A pair of right/left connectors 10a are provided at the lower front portion of the engine 10. In particular, the right/left connectors 10a are respectively supported by a pair of right/left mounts 23a of the front-linking frame bar 23. The front end of the engine 10 is supported by the front-linking frame bar 23, while the front end of the transmission 12 is supported also by the front-linking frame bar 23 via the engine 10. Provided at the rear of the transmission 12 is a bar-shaped connector 12a that extends in the lateral direction of the traveling vehicle body. The connector 12a is supported by brackets 22a of the pair of right/left vertical frame bars 22. The rear end of the transmission 12 is supported by the vertical frame bars 22, while the rear end of the engine 10 is also supported by the right/left pair of vertical frame bars 22 via the transmission 12. The exhaust muffler 11 is supported by the rear-linking frame bar 24 of the support structure 20 via an elastic support mechanism 30. The exhaust pipe 27 is supported by the front-linking frame bar 23 via the engine 10, and also supported by the rear-linking frame bar 24 via the exhaust muffler 11 and the elastic support mechanism 30.

Figure 2:
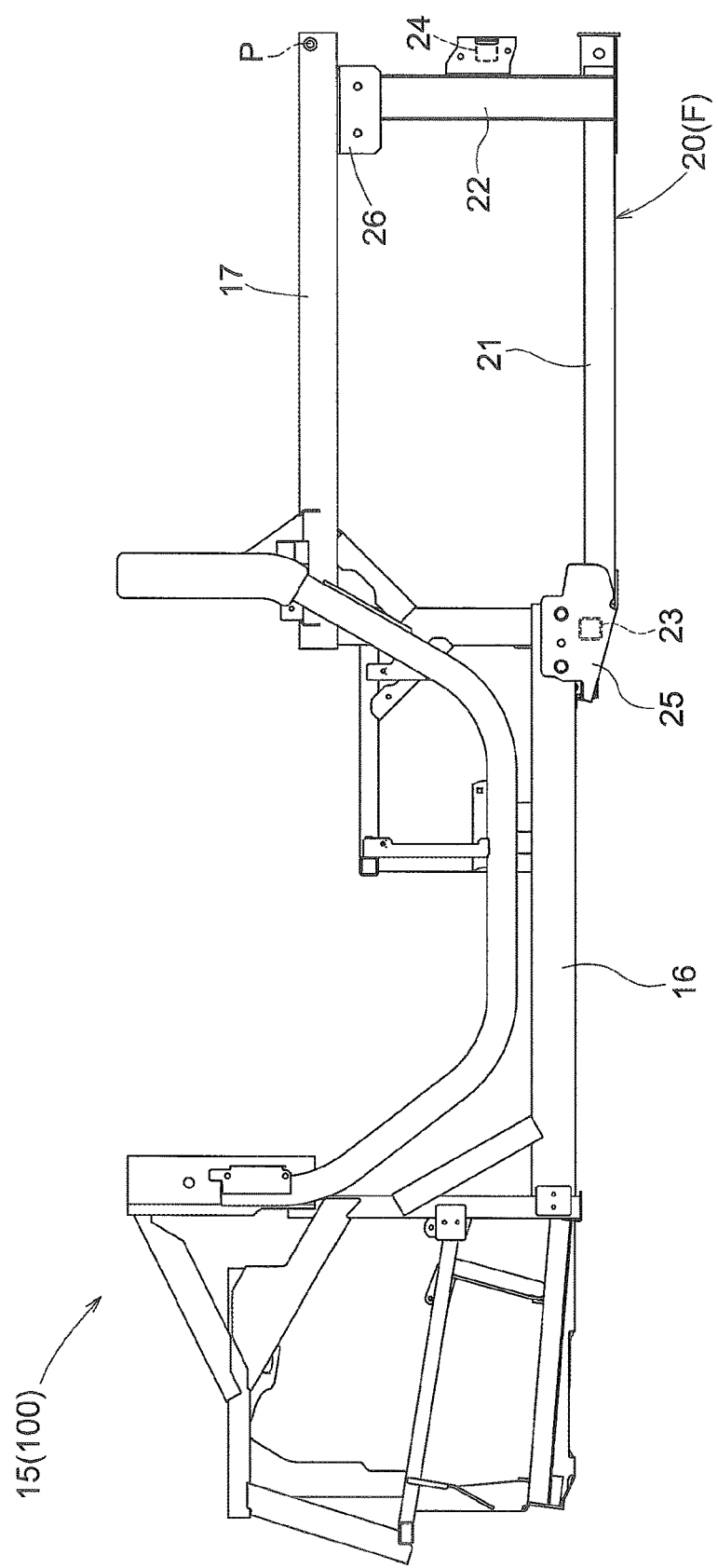

As shown in FIG. 2, the body frame 100 of the traveling vehicle body includes a first body frame section 15 and a second body frame section. The support structure 20 forms the second body frame section.

As shown in FIGS. 2 to 5, coupling members 25 are secured to the front ends of the right/left longitudinal frame bars 21. The right/left coupling members 25 are connected to the rear ends of a pair of right/left longitudinal frame bars 16 of the first body frame section 15. The top ends of the right/left vertical frame bars 22 are connected to the rear ends of platform supporting frame bars 17 of the first body frame section 15 via coupling members 26. The coupling members 26 are connected by welding to the vertical frame bars 22, and connected to the platform supporting frame bars 17 via connecting bolts. The second body frame section, which forms the support structure 20, is detachably connected to the rear ends of the right/left longitudinal frame bars 16 of the first body frame section 15, and to the rear ends of the platform supporting frame bars 17 of the first body frame section 15.

In this embodiment, an engine unit is pre-assembled by mounting the engine 10, the transmission 12, the exhaust muffler 11 and the exhaust pipes 27 on the second body frame section (i.e. the support structure 20) before the second body frame section is connected to the first body frame section 15. Then, the second body frame section (i.e. the support structure 20) is coupled to the first body frame section 15 to assemble the body frame 100, whereby all of the engine 10, the transmission 12, the exhaust muffler 11 and the exhaust pipes 27 can be mounted on the body frame 100 at once.

Configuration of Elastic Support Mechanism 30

As shown in FIGS. 3 and 5 to 7, the elastic support mechanism 30 includes a pair of elastic cylindrical members 31, a support platform member 32 and a pair of bar-shaped members 33.

Provided on the rear end of the support platform member 32 is a connector 32a extending downwards therefrom. A pair of right/left ribs 32d are provided on the rear surface of the support platform member 32. The connector 32a is supported by a bracket 24a of the rear-linking frame bar 24 via connecting bolts 34 extending in the longitudinal direction of the traveling vehicle body. The bolt holes 32b are formed in the connector 32a as guide holes elongated along the lateral width of the traveling vehicle body. By using the guiding elongation of the bolt holes 32b to slide the support platform member 32 relative to the bracket 24a, the mounting position of the support platform member 32 relative to the rear-linking frame bar 24 can be adjusted either laterally to the left (see FIGS. 5 and 7) or the right (see also FIGS. 5 and 7) on the body frame 100. In this embodiment, while three connecting bolts 34 are provided, any other suitable number of connecting bolts may be used, such as two or four, to be suited to the particular application. Alternatively thereto, the bolt holes of the bracket 24a may be formed as elongated guide holes.

A pair of mounting holes 32c are formed in alignment along the lateral width of the body frame 100 in the support platform member 32. The mounting holes 32c are arranged at a single position on the support platform member 32 in the longitudinal direction of the body frame 100 as seen from a lateral side of the body frame 100. The lower portions of the elastic cylindrical members 31 are fitted in the mounting holes 32c, respectively. The engagement between the elastic cylindrical members 31 and the support platform member 32 in the mounting holes 32c, the elastic cylindrical members 31 is placed in position relative to the support platform member 32 in both lateral direction and longitudinal direction of the body frame 100. A retainer (stopper) 35 is supported on the support platform member 32 to surround the outer peripheries of the portions of the elastic cylindrical members 31 that protrude above the mounting holes 32c. The retainer 35 prevents the elastic cylindrical members 31 from slipping up and out of the mounting holes 32c. Additionally, a metallic cylinder 31a is fitted around each elastic cylindrical member 31.

In other words, the pair of elastic cylindrical members 31 are supported by the support platform member 32 in such a posture that cylinderical member axes X ("axes X") of the elastic cylindrical members 31 extend in the longitudinal direction of the body frame 100. The elastic cylindrical members 31 are supported by the support platform member 32, wherein the elastic cylindrical members 31 are arranged side by side in the lateral direction of the body frame 100 in a single position on the support platform member 32 in the direction extending along the axes X as seen from a lateral side view of the body frame 100. In this embodiment, each elastic cylindrical member 31 is made of a rubber material. However, each elastic cylindrical member 31 may be made of other materials including as a non-rubber material such as sponge and synthetic resin.

Provided at the front end of each bar-shaped member 33 is a connecting arm 33a that extends upward from the bar-shaped member 33. The portion of the connecting arm 33a that is located above the bar-shaped member 33 and extends in parallel therewith is connected to the lower portion of the exhaust muffler 11 via a connecting member 36. The bar-shaped member 33 and the connecting member 36 are interconnected by welding. The connecting member 36 and the exhaust muffler 11 are interconnected also by welding. The pair of the bar-shaped members 33 are arranged side by side and supported on the exhaust muffler 11.

The pair of the bar-shaped members 33 are slidably fitted in the pair of the elastic cylindrical members 31 and elastically supported by the elastic cylindrical members 31, respectively. Both of the bar-shaped members 33 are inserted into the elastic cylindrical members 31 from the front side to the rear side thereof. The exhaust muffler 11 is elastically supported by the elastic cylindrical members 31 via the bar-shaped members 33. Under normal circumstances, the exhaust muffler 11 and the engine 10 are connected to each other via the exhaust pipe 27. Accordingly, as the exhaust muffler 11 does not move significantly along the longitudinal direction relative to the rear-linking frame bar 24, the bar-shaped members 33 do not slip out of the elastic cylindrical members 31. In this embodiment, the bar-shaped members 33 are inserted into the respective elastic cylindrical members 31 from the front side to the rear side thereof. Instead thereof, the bar-shaped members 33 may be inserted into the respective elastic cylindrical members 31 from the rear side to the front side thereof.

By moving the exhaust muffler 11 longitudinally along the body frame 100 to slide the bar-shaped members 33 relative to the elastic cylindrical members 31, the mounting position of the exhaust muffler 11 relative to the rear-linking frame bar 24 can be adjusted forward (see FIGS. 3 and 6) or rearward (see also FIGS. 3 and 6) on the body frame 100.

By raising/lowering the front end of the exhaust muffler 11, the bar-shaped members 33 may be vertically tilted relative to the elastic cylindrical members 31, while the bar-shaped members 33 elastically deform the cylinder members 31. In this way, the mounting posture of the exhaust muffler 11 can be adjusted upward (see FIGS. 3 and 6) or downward (see also FIGS. 3 and 6) relative to the rear-linking frame bar 24.

To mount (pre-assemble) the engine 10, the transmission 12, the exhaust muffler 11 and the exhaust pipe 27 on the support structure 20 (i.e. the second body frame section), the engine 10 and the transmission 12 are mounted on and supported by the front-linking frame bar 23 and the vertical frame bars 22 first. Then, the exhaust muffler 11 is connected to the engine 10 in this state via the exhaust pipe 27; and the exhaust muffler 11 in this state is connected to the rear-linking frame bar 24 via the elastic support mechanism 30. During this procedure, any one(s) of followings may be made, depending on necessity. If the support platform member 32 is slid relative to the bracket 24a, a mounting position of the exhaust muffler 11 may be adjusted relative to the rear-linking frame bar 24 along the lateral width (right/left direction) of the body frame 100. If the exhaust muffler 11 is moved to slide the bar-shaped members 33 relative to the elastic cylindrical members 31, the mounting position of the exhaust muffler 11 may adjusted relative to the rear-linking frame bar 24 along the length (fore/aft direction) of the body frame 100. If the exhaust muffler 11 is tilted to slide the bar-shaped members 33 relative to the elastic cylindrical members 31, a mounting posture of the exhaust muffler 11 may adjusted relative to the rear-linking frame bar 24 upward and downward. Whereby, the elastic support mechanism 30 can be adjusted, while supporting the exhaust muffler 11 without applying an undue stress to the elastic cylindrical members 31.

Modified Embodiments of the First Embodiment

The following describes only the differences from the foregoing embodiment:

(1) In the foregoing embodiment, the support platform member 32 is supported while allowing its position to be adjusted along the lateral width (right/left direction) of the body frame 100; and the elastic cylindrical members 31 are supported with the axes X thereof extending along the length (fore/aft direction) of the body frame 100. Alternatively thereto, the support platform member 32 may be supported while allowing its position to be adjusted along the length (fore/aft direction) of the body frame 100; and the elastic cylindrical members 31 may be supported with the axes X thereof extending along the lateral width (right/left direction) of the body frame 100.

(2) In the foregoing embodiment, the elastic cylindrical members 31 are supported by the support platform member 32, and the bar-shaped members 33 are supported by the exhaust muffler 11. Alternatively thereto, the elastic cylindrical members 31 may be supported by the exhaust muffler 11, and the bar-shaped members 33 may be supported by the support platform member 32.

(3) In the foregoing embodiment, a pair of elastic cylindrical members 31 is provided. Alternatively thereto, the present invention may be embodied with a single elastic cylindrical member 31.

(4) In the foregoing embodiment, all of the engine 10, the exhaust muffler 11, the transmission 12 and the exhaust pipe 27 are mounted (pre-assembled) on the body frame 100 at once, when the exhaust muffler 11 is supported by the elastic support mechanism 30. Alternatively thereto, the engine 10, the exhaust muffler 11, the transmission 12 and the exhaust pipe 27 may be mounted on the body frame 100 one by one, when the exhaust muffler 11 is supported by the elastic support mechanism 30.

(5) In the foregoing embodiment, the work vehicle is a multi-purpose vehicle, but the present invention is not limited thereto. Instead thereof, the present invention may also be applied to other types of work vehicles, such as tractors, carts and combine-harvesters. Instead of front and rear wheels, a crawler unit or a semi-crawler unit that combines wheels with mini-crawlers may be alternatively used as the travel mechanism.

Second Embodiment

Overall Configuration

Figure 8:
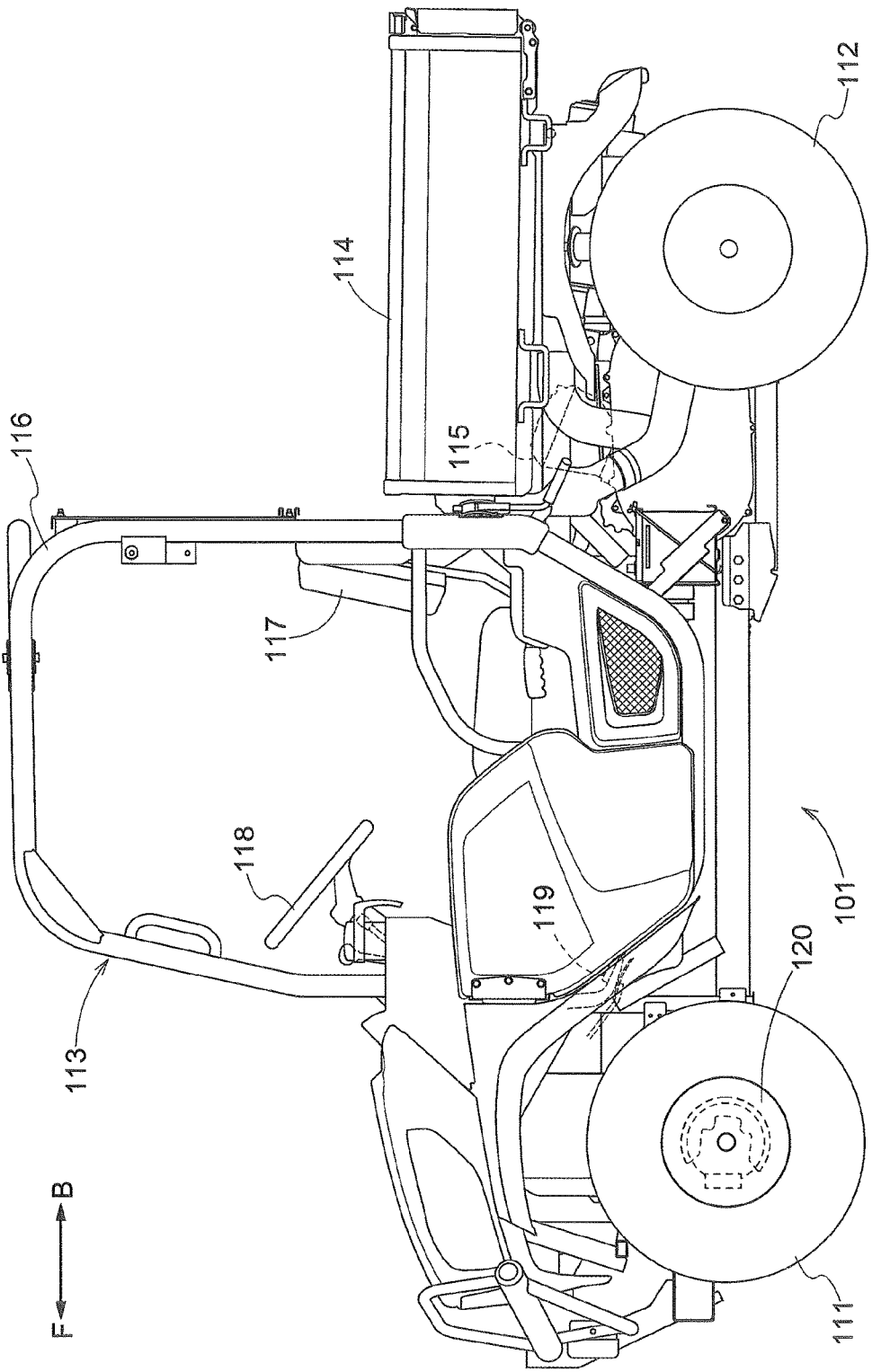

The multi-purpose vehicle (one example of a work vehicle) shown in FIG. 8 includes a drivable and steerable travel mechanism, such as a pair of right/left front wheels 111, and a drivable travel mechanism, such as a pair of right/left rear wheels 112. In this way, the traveling vehicle body 101 of the multi-purpose vehicle is configured to be capable of traveling on the pair of right/left front wheels 111 and the pair of right/left rear wheels 112.

A driver section 113 for seating an operator for driving the vehicle is provided in the central portion of the traveling vehicle body 101. A load-carrying platform 114 ("platform 114" hereinafter) that can be loaded with cargo is provided at the rear of the traveling vehicle body 101. Provided below the platform 114 of the traveling vehicle body 101 is a drive section that includes a water-cooled gasoline engine 115, etc.

As shown in FIG. 8, the driver section 113 is surrounded and protected by a ROPS frame 116. The driver section 113 includes a driver seat 117 for seating an operator and a passenger seat (not shown) for seating a passenger. In addition, the driver section 113 also includes a steering handle 118 for steering the right/left front wheels and a brake pedal 119 for applying brakes to the traveling vehicle body 101.

Brake System

A brake system 103 is provided in the disc wheel 120 of each front wheel 111 for applying brakes as the brake pedal 119 is stepped on.

Figure 9:
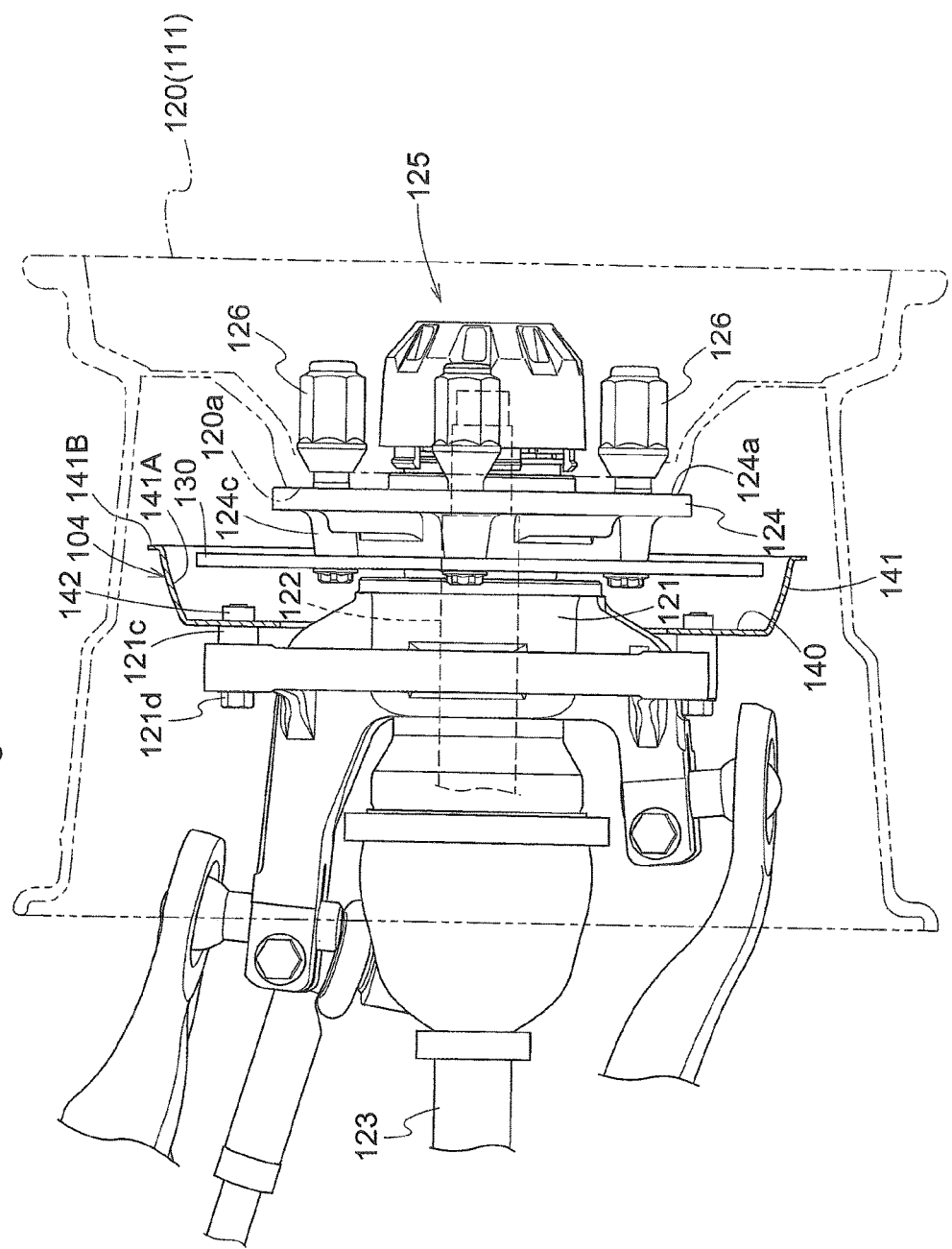

As shown in FIG. 9, the right/left front wheels 111 are each rotatably shaft-supported on a front axle case 121 that is independently suspended by a suspension mechanism (not shown).

A front axle 122 fitted in the front axle case 121 is connected to a transmission shaft 123 extending from a front differential gear (not shown) via a spherical joint (not shown). A disc wheel 120 for the front wheel 111 is mounted on a disc-shaped wheel support hub 124 attached to the outer end of the front axle 122 so as to be rotatable in unison therewith.

That is, as shown in FIGS. 9 to 13, the front axle 122 is inserted through the wheel support hub 124 while a fixing nut 125 is fitted on the outer end of the front axle 122. The outer end of the front axle 122 has a spline portion 122a formed with spline grooves and a screw portion 122b. A spline cylindrical portion (not shown) to be fitted on the spline portion 122a is provided on the inner side of the wheel support hub 124, and the wheel support hub 124 is tightened by a fixing nut 125 including a lock nut 125a that is screwed on the screw portion 122b, and a decorative nut 125b. In this way, the wheel support hub 124 is integrally rotatably secured to the front axle 122.

Four bolt holes 124b are circumferentially formed in the lateral outer surface 124a of the wheel support hub 124. With an attachment surface 120a of the disc wheel 120 abutted against the lateral outer surface 124a of the wheel support hub 124, a fixing bolt 126 is screwed and tightened in each bolt hole 124b to secure the disc wheel 120 to the wheel support hub 124.

Formed on a side of the wheel support hub 124 that is opposite to the lateral outer surface 124a abutted by the attachment surface 120a of the disc wheel 120 are four support projections 124c for attaching and securing a disc rotor 130 of the brake system 103.

Four connecting holes 130a formed in the disc rotor 130. A connecting bolt 127 is inserted through each of the connecting holes 130a and screwed into a bolt hole (not shown) formed in the support projection 124c, thereby integrally rotatably connecting the disc rotor 130 with the wheel support hub 124.

Figure 10:
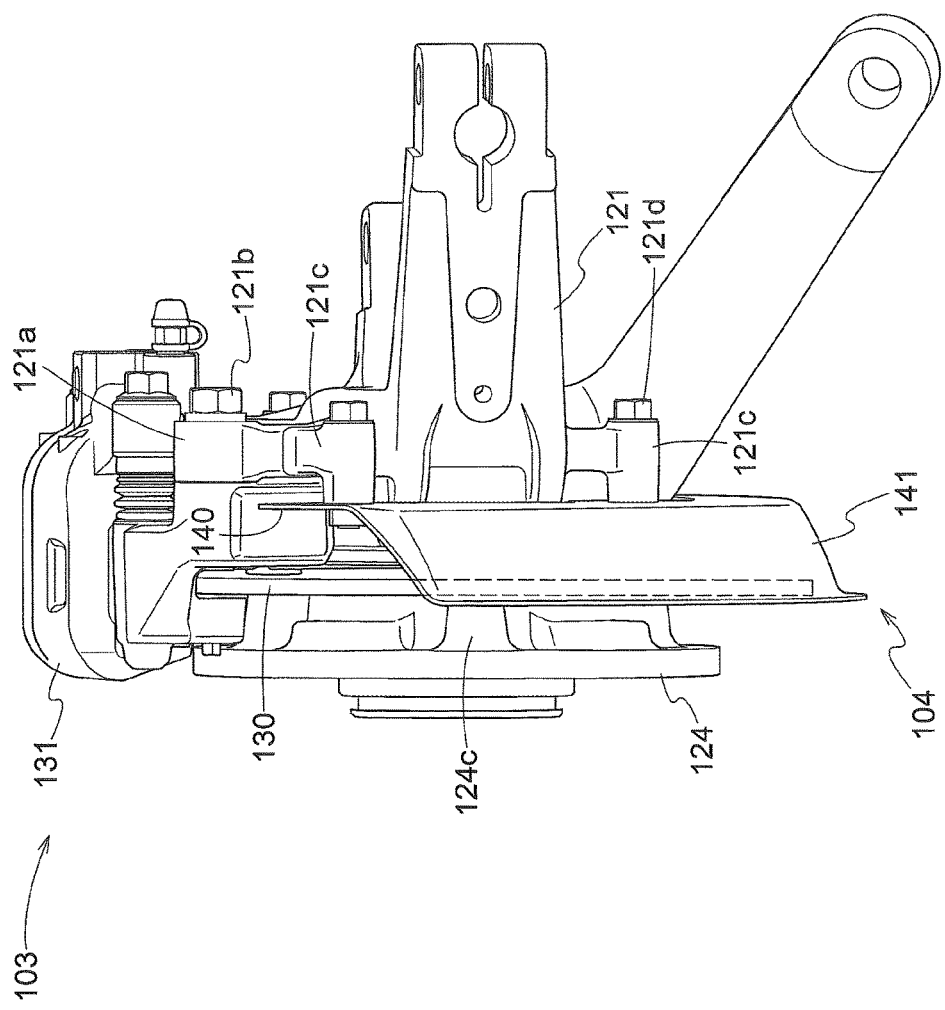
Figure 11:
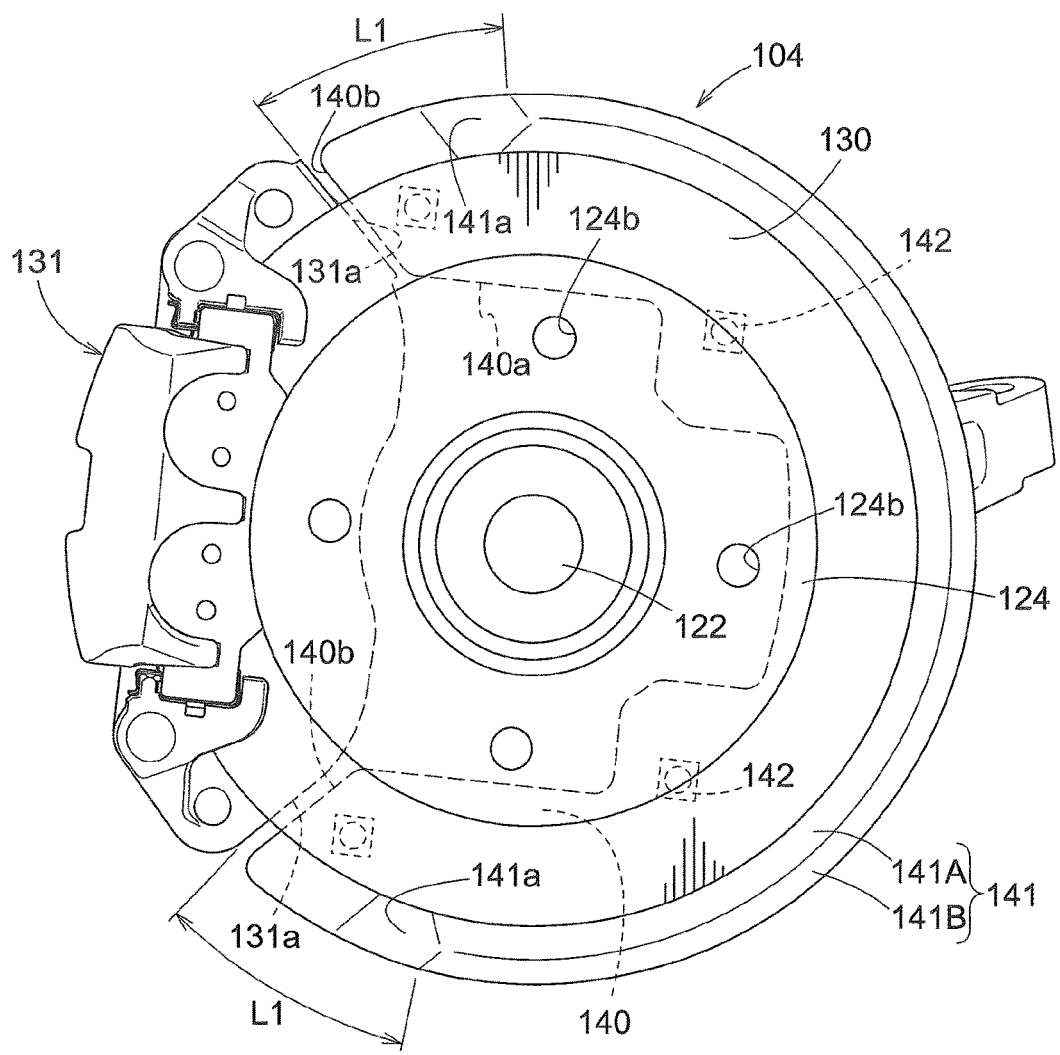
Figure 12:
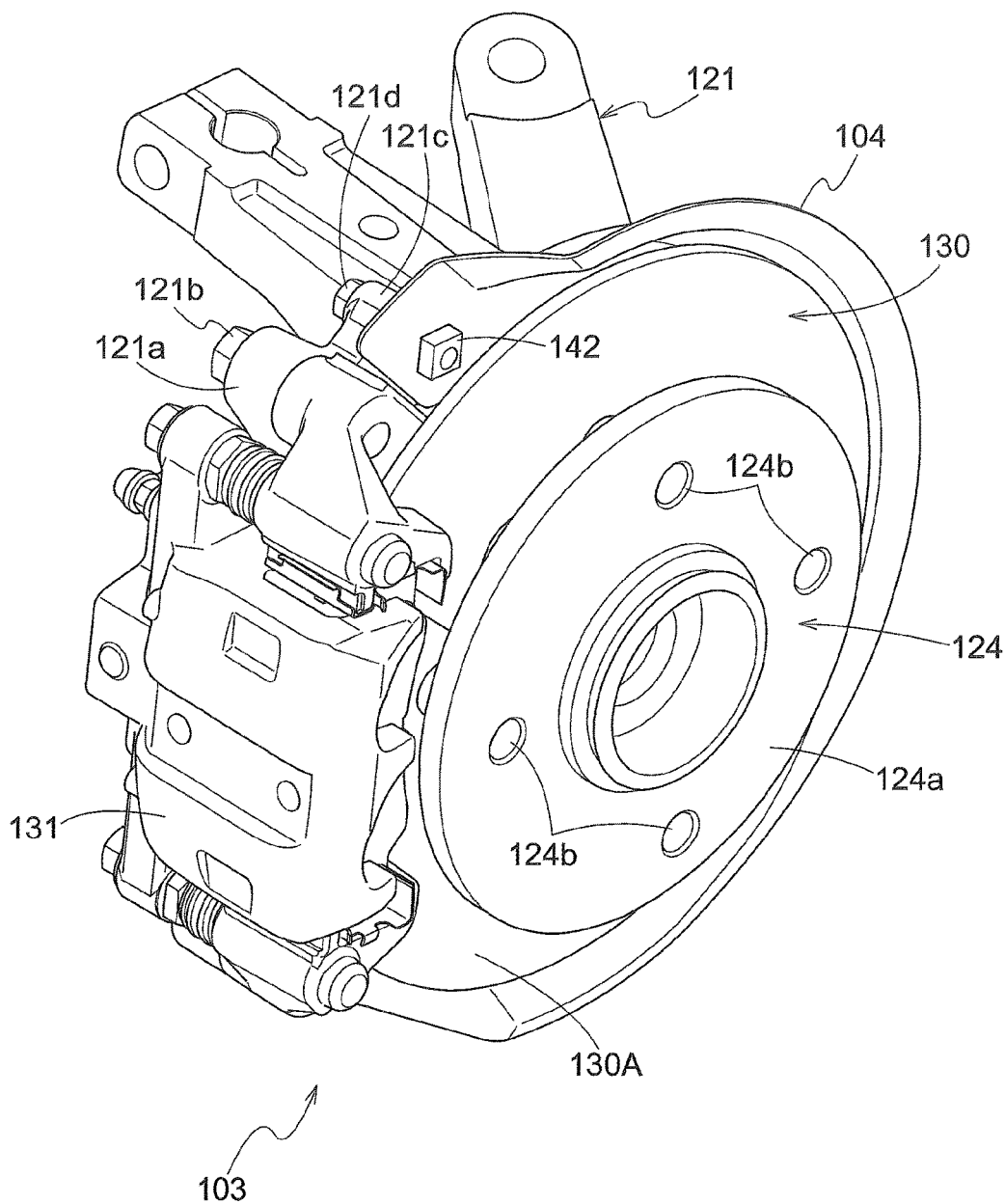

As shown in FIGS. 10 to 12, the brake system 103 includes a caliper 131 for applying a braking force to the disc rotor 130. The caliper 131 is mounted on the front axle case 121 on the front end of the front axle 122.

The caliper 131 includes brake pads (not shown) opposing each other across both sides of the disc rotor to "straddle" the disc rotor 130, thus being disposed partially circumferentially around the disc rotor 130.

The caliper 131 is of a floating type. Although not shown, a cylinder portion that contains pressing pistons for generating braking pressure is also provided at a position located on the vehicle interior side relative to the disc rotor 130, that is, on a side opposite to the wheel support hub 124.

As pressure oil is supplied to the cylinder portion of the caliper 131, the brake pads pinch the disc rotor 130 on both sides thereof to apply a braking force thereto.

The wheel support hub 124, the disc rotor 130, and the caliper 131 are all contained in the space defined within the rim portion 120b of the disc wheel 120.

Cover Body

As shown in FIGS. 10 to 13, a cover body 104 for covering the side of the disc rotor 130 facing inward in the vehicle body except where the caliper 131 exists is provided at a position located on the vehicle interior side relative to the disc rotor 130.

Figure 13:
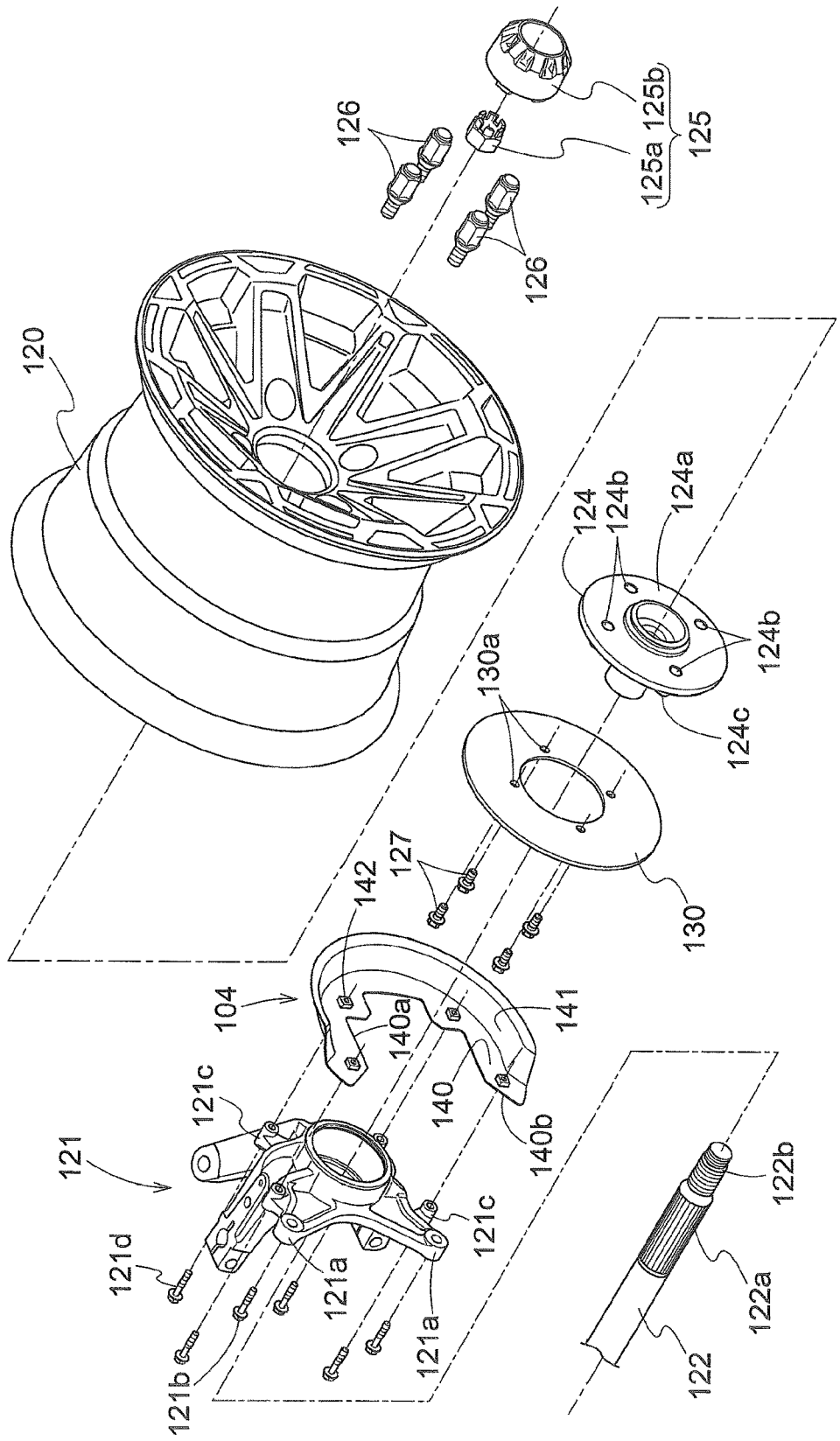

As shown in FIGS. 11 and 13, the cover body 104 surrounds the periphery of the front axle 122 and is formed, as seen in a side elevation, in a reverse C shape around the circumference of the disc rotor 130 except where the caliper 131 exists.

The cover body 104 includes a vertical wall surface 140 opposing the side of the disc rotor 130 that faces inward in the vehicle body, and a circumferential wall surface 141 opposing the outer circumferential surface of the disc rotor 130.

An inner peripheral edge 140a that is formed in a recess shape and surrounds the periphery of the front axle 122 is formed at an interior position on the vertical wall surface 140 in the radial direction. Four fixing nuts 142 for fixing the cover to the front axle case 121 are welded to the vertical wall surface 140 close to the inner peripheral edge 140a. Otherwise and elsewhere, the vertical wall surface 140 is made of a flat plate member without holes.

The circumferential wall surface 141, which is connected with the outer periphery of the vertical wall surface 140, has an arcuate form curved along the outer circumferential surface of the disc rotor 130 and is again made of a flat plate member without holes.

The circumferential wall surface 141 includes a flared inclined plane portion 141A that extends at an oblique angle laterally outward with the diameter increasing toward the vehicle outside, where the disc rotor 130 is, from the inner periphery of the circumferential wall surface 141 connected with the outer periphery of the vertical wall surface 140. The circumferential wall surface 141 additionally includes a flange portion 141B that is erected on the outer end of the flared inclined plane portion 141A and extends along the vertical wall surface 140. The flange portion 141B is substantially flush with the surface of the disc rotor 130 on the vehicle laterally outer side or slightly projects laterally outward from that surface.

Due to the presence of the foregoing cover body 104, it is less likely for pebbles, dirt or other foreign matter to fly around the cover body 104 from inside the vehicle body and enter the space where the disc rotor 130 is located.

Moreover, as the circumferential wall surface 141 includes the flared inclined plane portion 141A, even if pebbles or dirt flies around the cover body 104 from inside the vehicle body and enters the space where the disc rotor 130 is located, the pebble or dirt is likely to be guided by the flared inclined plane portion 141A and discharged in a radially outward direction.

Due to the presence of the flange portion 141B at the outer end of the flared inclined plane portion 141A, it is less likely for pebbles or dirt to fly around the cover body 104 from inside the vehicle body and enter the space where the disc rotor 130 is located.

In addition, the flared inclined plane portion 141A and the flange portion 141B also contribute to increasing the overall strength of the cover body 104.

Referring to in FIG. 11, as for the physical relationship between the cover body 104 and the caliper 131, circumferential edges 140b of the vertical wall surface 140 of the cover body 104 are disposed closer to the caliper 131 than circumferential edges 141a of the circumferential wall surface 141. Due to this configuration, predetermined intervals L1 are created circumferentially between the circumferential edges 131a of the caliper 131 and the circumferential edges 141a of the circumferential wall surface 141.

As the vertical wall surface 140 is present in the intervals L1, this still makes it unlikely for foreign matter to go over the cover body 104 from inside the vehicle body and enter the space where the disc rotor 130 is located, but at the same time, as the circumferential wall surface 141 is not present in these locations, the radially outward portion of the disc rotor 130 is partially open or exposed to the outside as shown in FIG. 10. In this way, as the intervals L1 are located close to the caliper 131, the heat generated in the caliper 131 and the disc rotor 130 can easily and efficiently be dissipated upon application of brakes by the caliper 131.

Additionally, as the cover body 104 is present almost all around the entire circumference of the disc rotor 130 except where the caliper 131 is present, the function of the cover body 104 to prevent foreign matter from flying around the cover body 104 from inside the vehicle body and entering the space where the disc rotor 130 is located is hardly affected, regardless of the rotating direction of the front wheels 111, i.e. forward or rearward.

The cover body 104 is also contained in the space defined within the rim portion 120b of the disc wheel 120.

As shown in FIGS. 12 and 13, the caliper 131 is mounted on mounting arms 121a of the front axle case 121 via mounting bolts 121. The mounting arms 121a support the end portions of the calipers 131 along two circumferential positions of the disc rotor 130.

As shown in FIGS. 9, 10, 12 and 13, the cover body 104 is mounted on the front axle case 121 at four cover mounting portions 121c that are separately located from the mounting arms 121a, where the caliper 131 is mounted. The cover mounting portions 121c each include a through hole for inserting a bolt therethrough. By inserting cover mounting bolts 121d through these holes and screw them into the fixing nuts 142 provided at four locations in the vertical wall surface 140 of the cover body 104, the cover body 104 can be securely connected to the front axle case 121.

Modified Embodiments of the Second Embodiment

The following describes only the differences from the foregoing embodiment:

(1) In the foregoing embodiment, the cover body 104 includes a vertical wall surface 140 opposing the side of the disc rotor 130 that faces inward in the vehicle body and a circumferential wall surface 141 opposing the outer circumferential surface of the disc rotor 130. The present invention is not so limited.

Figure 14:
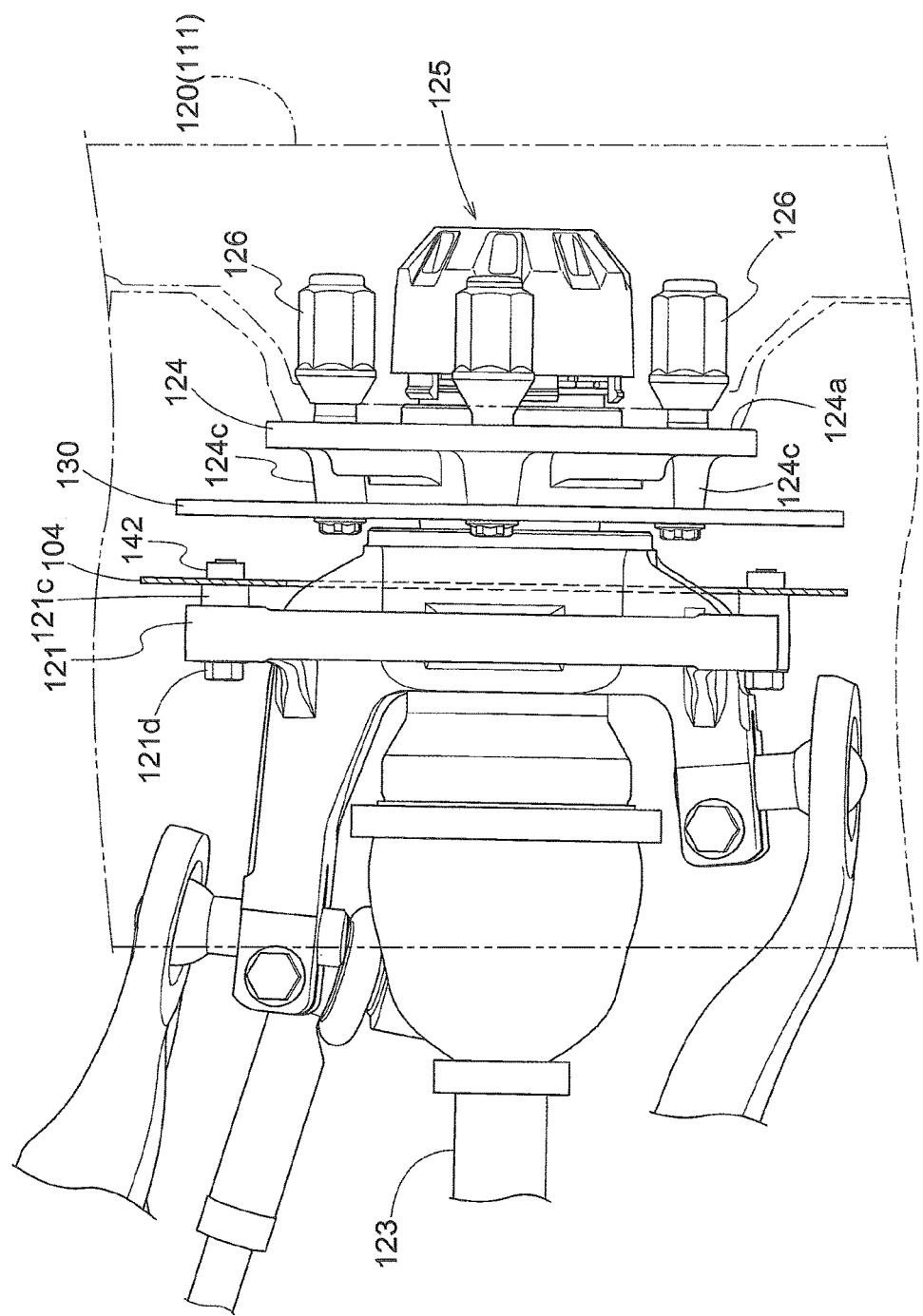

For example, as shown in FIG. 14, the cover body 104 may have a configuration in which the circumferential wall surface 141 opposing the outer circumferential surface of the disc rotor 130 is omitted and only the vertical wall surface 141 opposing the side of the disc rotor 130 that faces inward in the vehicle body is provided.

(2) While the foregoing embodiment employs the float-type caliper 131, the invention is not limited to this type and, for example, may employ a fixed-type caliper.

(3) While the foregoing embodiment employs the hydraulic-actuated caliper 131, the invention is not limited to this type and, for example, may employ an electric cylinder to generate braking pressure.

(4) While a multi-purpose vehicle is described as an example of the work vehicle of the foregoing embodiment, the present invention is not so limited. The present invention may also be applied to other types of work vehicles, such as tractors, mowing machines, combine-harvesters, rice transplanters and construction machines.

Third Embodiment

Overall Configuration

Figure 15:
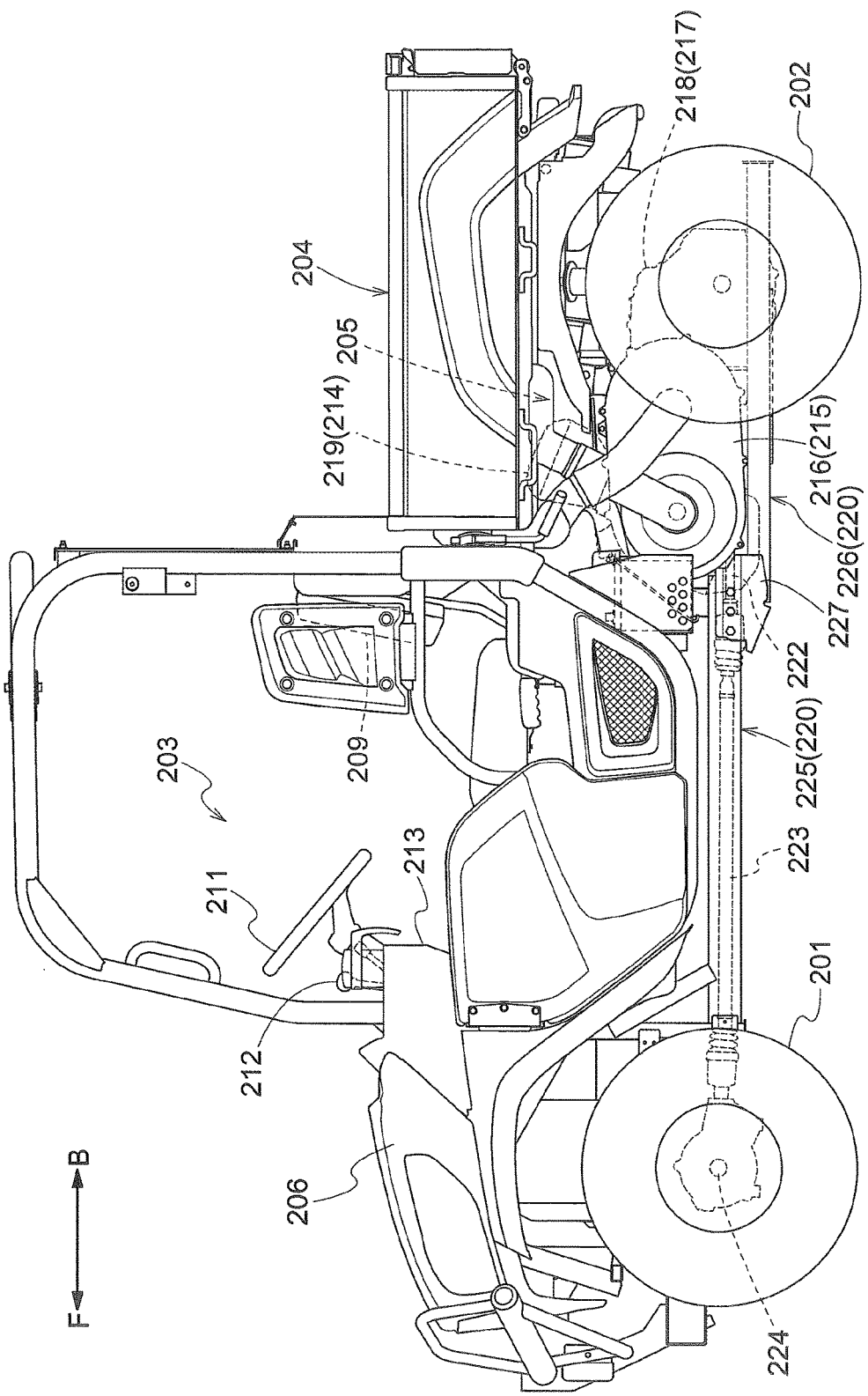
Figure 16:
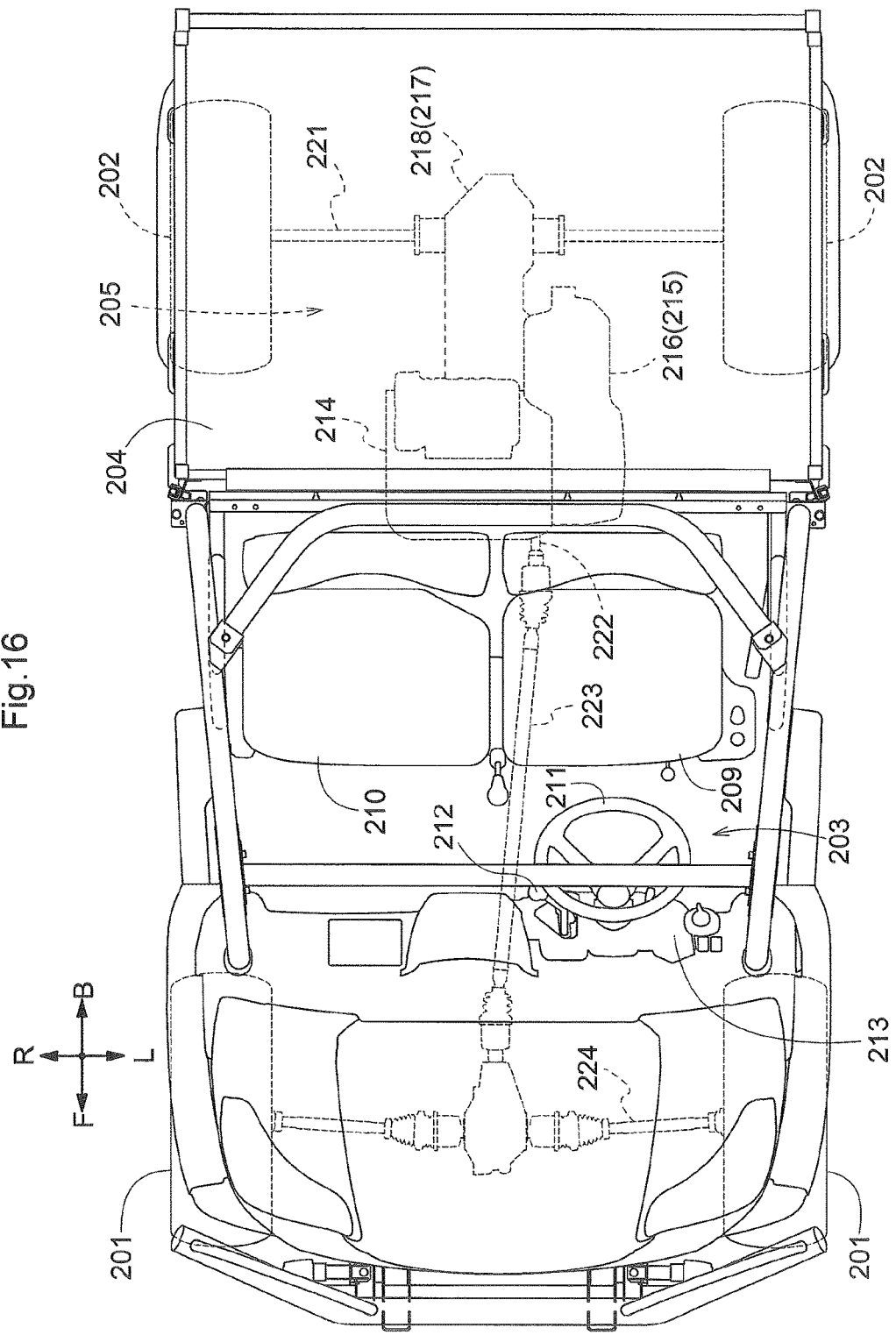

FIGS. 15 and 16 show a multi-purpose vehicle as an example of a work vehicle. The multi-purpose vehicle includes a pair of right/left steerable and drivable front wheels 201 and a pair of right/left drivable and non-steerable rear wheels 202. A driver section 203 is provided at the longitudinal center of the vehicle body. A load-carrying platform 204 ("platform 204" hereinafter) is provided rearward of the driver section 203. A drive section 205 is provided below the platform 204. Additionally, an openable and closable hood 204 is provided in front of the driver section 203.

The right/left front wheels 201 and the right/left rear wheels 202 are supported by a body frame 220 via a suspension mechanism, which will be described in further detail below, so as to be freely vertically movable. Although detailed description thereof is hereby omitted, the body frame 220 is generally structured as a framework including a plurality of longitudinal frame members, a plurality of lateral frame members, a plurality of vertical frame members, etc.

The driver section 203 includes a driver seat 209 for seating an operator, a passenger seat 210 adjacent to the driver seat 209 for seating a passenger, a steering wheel 211 for being operated to steer the vehicle, and a gear shift lever 212 for being operated to shift the gear. The steering wheel 211 and the gear shift lever 212 are disposed on a driving panel 213 fitted in the front portion of the driver seat 209.

The platform 204 is configured to be switchable between a loading position in which the platform 204 can be loaded with cargo and a damping position in which the platform 204 is tilted to damp cargo. The platform 204 can be pivoted on a lateral axis to raise its front end to be able to dump cargo from its rear end. The platform 204 may be switched between these positions, for example, by operating a hydraulic actuator.

Figure 17:
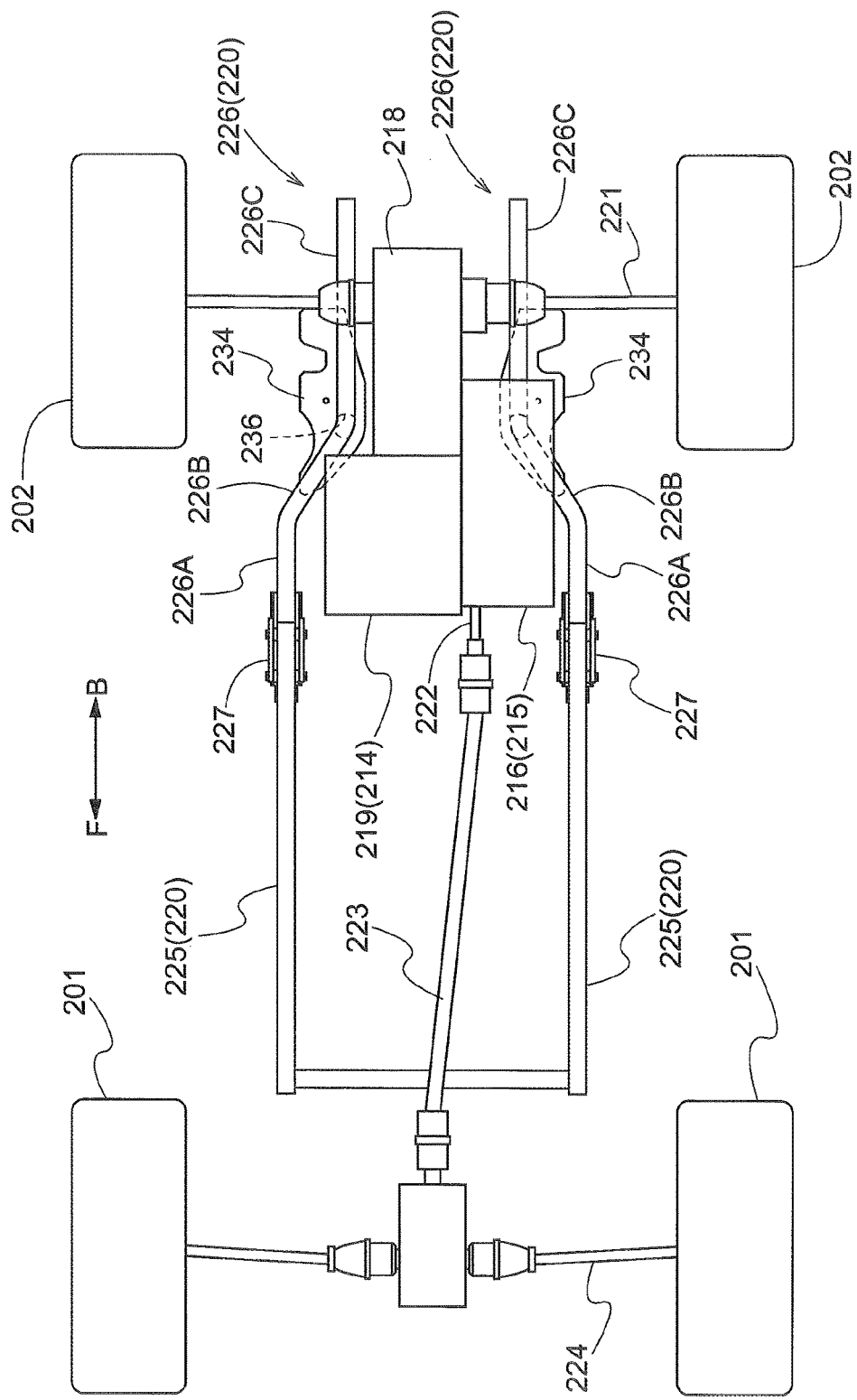

As shown in FIGS. 16 and 17, the drive section 205 includes a water-cooled gasoline engine 214 (referred to as "engine" hereinafter), a variable speed drive case 216 that encloses a belt-type stepless variable speed drive 215, and a transmission case 218 that encloses a gear-type transmission 217.

As shown in FIGS. 15 and 16, the engine 214 is arranged in a manner that orients its crankshaft in the lateral direction of the vehicle body and sets its cylinder head 219 in a rearwardly tilted position. The engine 214 is of a two cylinder engine. The variable speed drive case 216 is connected and supported to one side of the engine 214 and the transmission case 218. The transmission case 218 is connected and supported at the rear of the engine 214. The engine 214, the transmission case 218, etc., are supported by the body frame 220.

The power of the engine 214 is transmitted to the gear-type transmission 217 via the belt-type stepless variable speed drive 215. The gear-type transmission 217 can provide power transmission with two forward speeds, one reverse speed, and a neutral through the operation of the gear shift lever 212. As shown in FIGS. 16 and 17, power is transmitted from the gear-type transmission 217 to the rear axle 221 and subsequently to the right/left rear wheels 202. Power can also be transmitted from the gear-type transmission 217 to the front axle 224 via a power take-off shaft 222, a propeller shaft 223, etc., and subsequently to the right/left front wheels 201 from the front axle 224. The power take-off shaft 222 is located below the engine 214.

As shown in FIG. 17, as the plurality of longitudinal frame members, the body frame 220 includes front frames 225 located below the driver section 203 and lower rear side frames 226 located below the drive section 205 (referred to as "lower rear frames" hereinafter) (i.e. exemplary support frames). The pair of right/left front frames 225 and the pair of right/left lower rear frames 226 are linearly and longitudinally connected to each other via coupling members 227.

Figure 18:
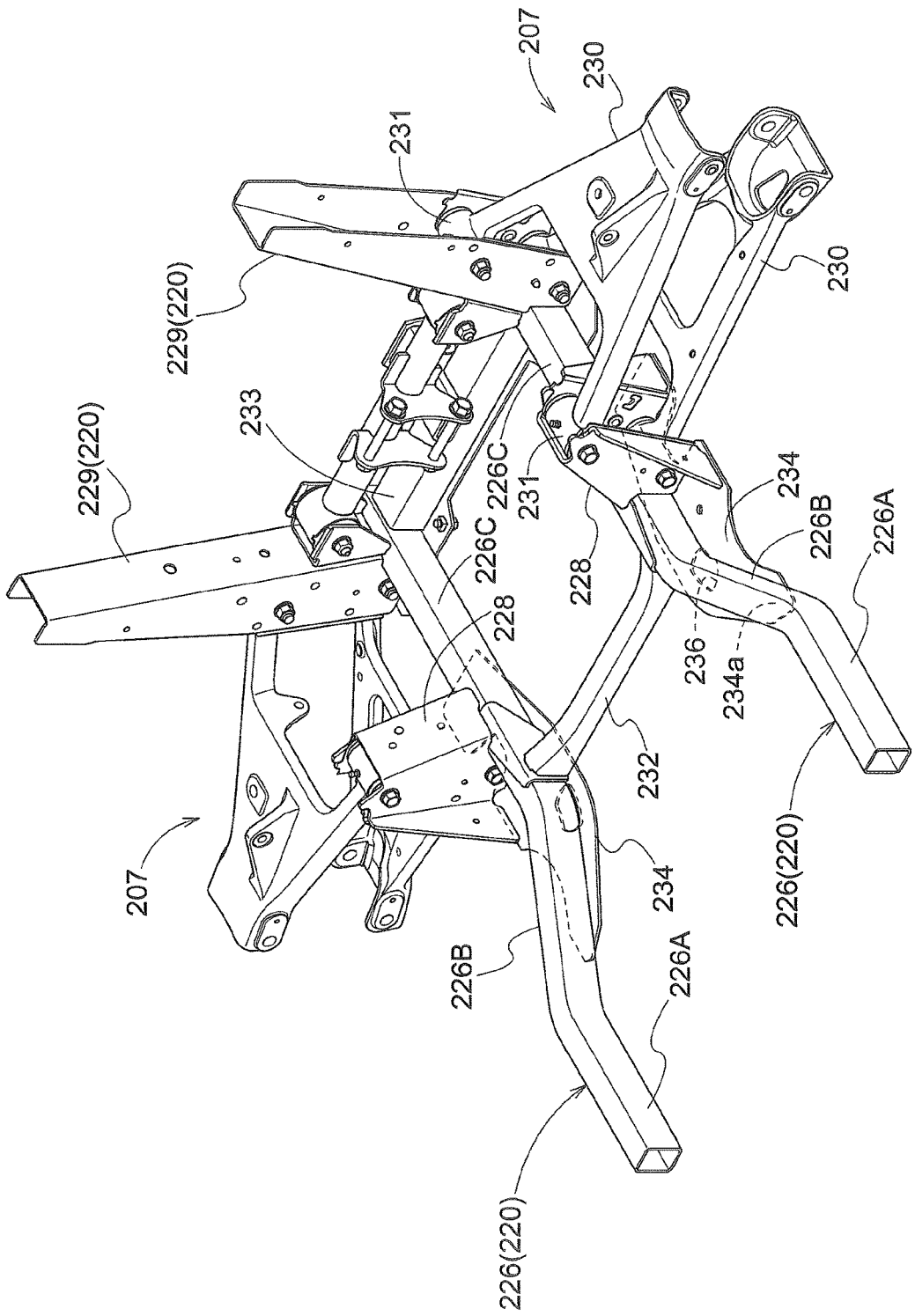

As shown in FIGS. 17 and 18, the right/left lower rear frames 226 are formed of square tubes (i.e. square pipes) and include front sections 226A connected to the rear ends of the front frames 225 and extending in the longitudinal direction, oblique intermediate sections 226B connected to the rear ends of the front sections 226A and extending obliquely and inwardly toward the rear of the vehicle body, and rear sections 226C connected to the rear ends of the oblique intermediate sections 226B and extending in the longitudinal direction. As can be seen, the right/left front sections 226A are spaced apart from each other by the same distance by which the right/left front frames 225 are spaced apart. On the other hand, the right/left rear sections 226C are spaced apart from each other by a shorter distance than that.

As shown in FIG. 18, a pair of support brackets 228 and a pair of support brackets 229 for supporting a double wishbone-type suspension mechanism 207 are mounted on locations close to the bends where the oblique intermediate sections 226B and the rear sections 226C of the lower rear frames 226 are connected and also on the rear ends of the right/left lower rear frames 226, respectively. The front and rear brackets 228, 229 are all formed in an approximately U-shape as seen in a plan view.

The suspension mechanism 207 includes, on each side of the body frame, a pair of upper and lower rocking arms 230 formed in an approximately A-shape as seen in a plan view. Rotatable boss portions 231 are provided on the ends on the vehicle interior side of the rocking arms 230. These boss portions 231 are freely pivotally supported on longitudinal axes in the support brackets 228, 229. Although omitted from the view, the outer end on the vehicle outer side of each rocking arm 230 is also pivotally supported by an axle case (not shown) of the rear wheel 202.

Each front support bracket 228 has a minimal vertical length required to support the upper and lower rocking arms 230. Each rear support bracket 229 is vertically elongated to reach upper rear frames (not shown) located above the lower rear frames 226. In other words, the rear support brackets 229 vertically connect the lower rear frames 226 and the upper rear frames (not shown) and constitute a part of the body frame 220.

As shown in FIG. 18, the right/left bends of the lower rear frames where the oblique intermediate sections 226B are continuous with the rear sections 226C are connected to each other by a front lateral frame 232. In addition, the rear ends of the right/left rear sections 226C of the lower rear frames 226 are connected to each other by a rear lateral frame 233.

Reinforcing plates 234 are connected to the lower rear frames 226 to cover the lower sides of the front support brackets 228 and the areas including the bends of the lower rear frames 226 where the oblique intermediate sections 226B are continuous with the rear sections 226C. As shown in FIG. 18, each of the reinforcing plates 234 is made of a flat plate formed with a recess 235 (see FIG. 19) that conforms to the approximately U-shape of the front support bracket 228 where the front support bracket 228 is supported. The recess 235 is configured to permit the rock arm 230 to vertically pivot.

Figure 19:
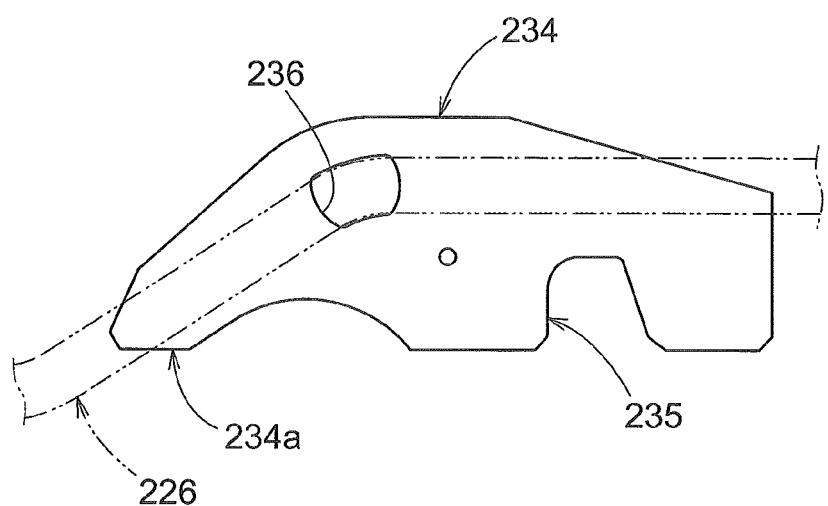

As shown in FIGS. 18 and 19, formed in the part of the reinforcing plate 234 that corresponds to the bend of the lower rear frame 226 is an insertion hole 236 wider than the lateral width of the lower rear frame 226. Even if the lower rear frame 226 made of a square tube vertically bulges or otherwise deforms as a result of bending, the insertion hole 236 allows the reinforcing plate 234 to be connected to the flat surface of the lower rear frame 226 while abutment with the bulge is avoided.

As shown in FIG. 19, also formed on the reinforcing plate 234 is a tapered portion 234a that extends toward the oblique intermediate sections 226B of the lower rear frame 226. The tapered shape facilitates distribution of stress, thus preventing failure due to concentration of stress.

Modified Embodiments of the Third Embodiment

The following describes only the differences of the modified embodiments from the foregoing embodiment:

(1) In the foregoing embodiment, the engine 214 is disposed between the front sections 226A of the lower rear frames 226. Alternatively, a different drive unit, such as a traveling drive motor, may be used instead of the engine.

(2) In the foregoing embodiment, a gasoline engine is installed on-board as the power source of the vehicle. Alternatively, a diesel engine may be installed, or the vehicle may also be a hybrid including both an engine and a traveling drive motor. The vehicle of the embodiment may also be provided only with a traveling drive motor.

(3) While the foregoing embodiment is described as having a belt-type stepless variable speed drive 215 as an exemplary transmission, a hydrostatic stepless variable-speed drive may be alternatively employed in the vehicle.

(4) While the driver section can seat two persons in the foregoing embodiment, the vehicle may be modified to seat three or more persons.

(5) While the work vehicle of the foregoing embodiment is a multi-purpose work vehicle, the present invention is not limited thereto. Instead thereof, the present invention may also be applied to other types of work vehicles that include a pair of right/left support frames that extend in the longitudinal direction of the vehicle body.

Fourth Embodiment

Overall Configuration

Figure 20:
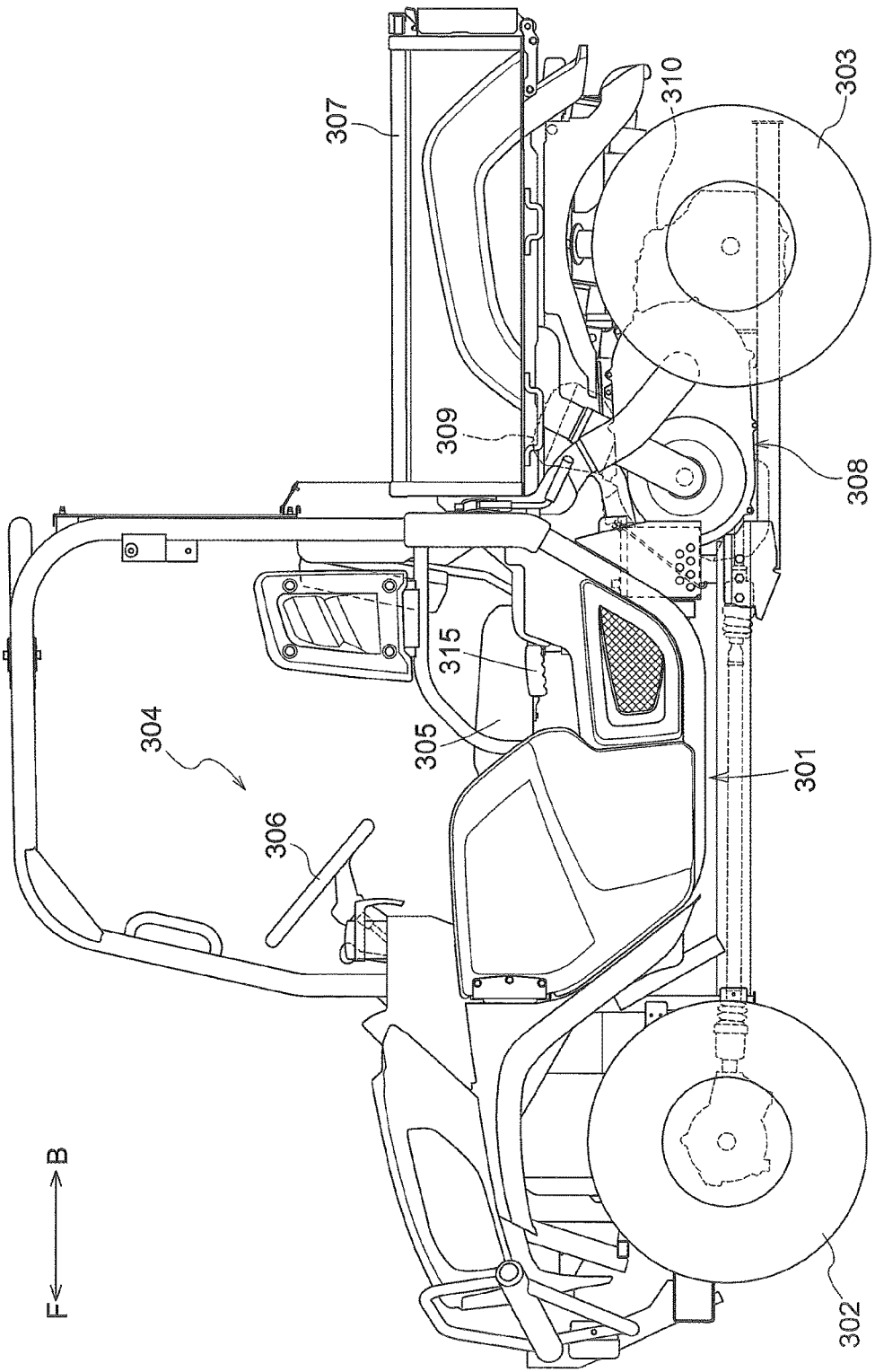

With reference to FIG. 20, a utility vehicle includes a traveling vehicle body 301 having a pair of right/left drivable and steerable front wheels 302, and a pair of right/left drivable rear wheels 303. A driver section 304 is formed in the front of the traveling vehicle body 301. A driver seat 305 and steering wheel 306 for steering the front wheels 302 are provided in the driver section 304. A load-carrying platform 307 ("platform 307" hereinafter) is provided at the rear of the traveling vehicle body 301. A drive section 308 is formed below the platform 307. An engine 309 or the like for transmitting power to the front wheels 302 and the rear wheels 303 is provided in the drive section 308.

A rear wheel differential gear (not shown), a differential lock device 311, and a parking brake 312 are provided in a rear wheel drive case 310 for transmitting the power from the engine 309 to the right/left rear wheels 303.

Figure 21:
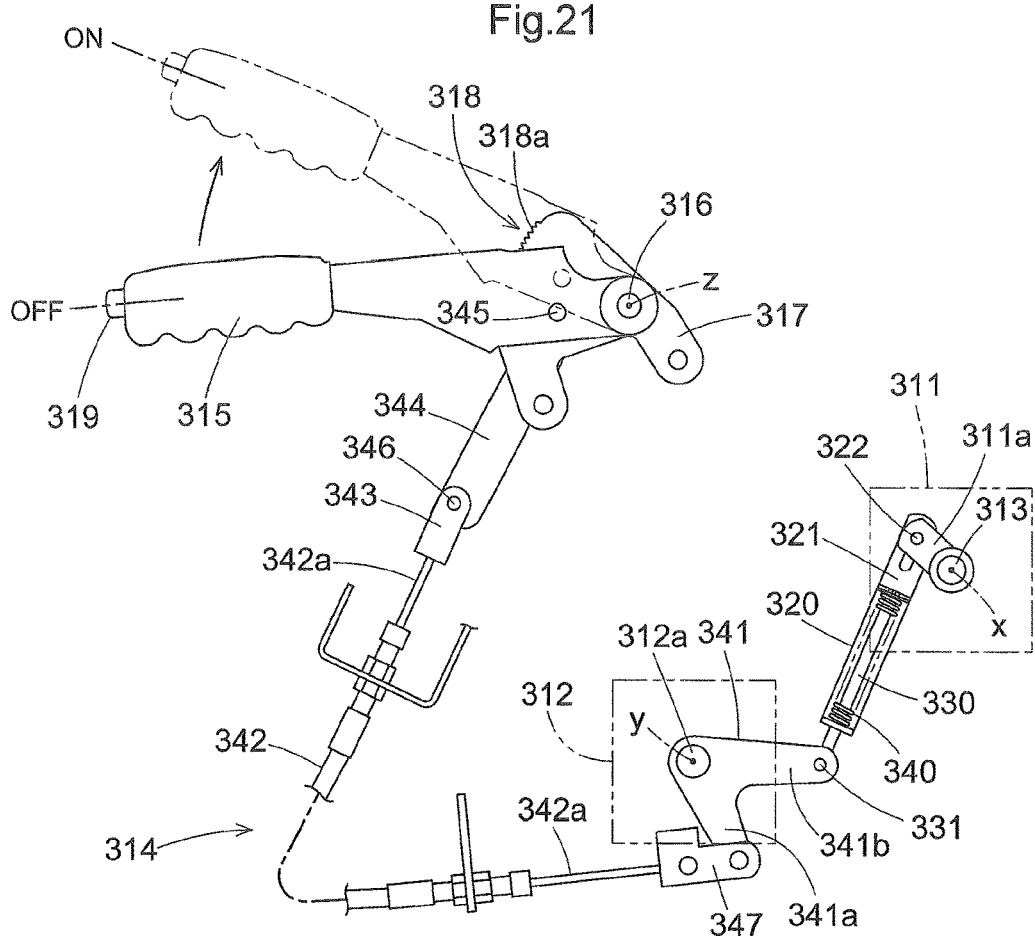

As shown in FIG. 21, the differential lock device 311 includes a control portion 311a for switching the differential lock device 311 between engaged and disengaged conditions by pivoting the control portion 311a about the axis (x) of a rotatable support shaft 313. The control portion 311a is provided outside of the rear wheel drive case 310. Upon being engaged, the differential lock device 311 places the rear wheel differential gear in a locked condition in which the right/left rear wheels 303 cannot have different rotational speeds. Conversely, upon being disengaged, the differential lock device 311 places the rear wheel differential gear in an unlocked condition in which the right/left rear wheels 303 can have different rotational speeds.

As also shown in FIG. 21, the parking brake 312 includes a control portion 312a rotatably operated to switch the parking brake 312 between engaged and disengaged conditions. The control portion 312a is provided outside of the rear wheel drive case 310. Upon being engaged, the parking brake 312 applies a braking force to the transmission system of the right/left rear wheels 303 to apply parking brake to the right/left rear wheels 303. Conversely, upon being disengaged, the parking brake 312 no longer applies braking force to the transmission system of the right/left rear wheels 303 to release the parking brake that has been applied to the right/left rear wheels 303.

Structures and Operation of Differential Lock Device 311 and Parking Brake 312

As shown in FIG. 21, a brake lever (an example of an operating device) 315 is operably connected to the control portion 311a of the differential lock device (an example of an operated device) 311 and the control portion 312a of the parking brake (another example of an operated device) 312 via an interlocking mechanism 314. By placing the brake lever (an example of an operation tool) 315 in an engaged position ON, the differential lock device 311 and the parking brake 312 can be switched to engaged conditions in which the right/left rear wheels 303 may integrally rotate without having different rotational speeds while the brakes are engaged. By placing the brake lever 315 in a disengaged OFF position, the differential lock device 311 and the parking brake 312 can be switched to disengaged conditions in which the right/left rear wheels 303 may independently rotate at different rotational speeds while the brakes are disengaged.

The following provides more detailed description of structures and operation of the differential lock device and the parking brake.

As shown in FIG. 20, the brake lever 315 is disposed on one lateral side of the driver section 304. As shown in FIG. 21, the brake lever 315 is supported by a support member 317 via a support shaft 316 so as to be pivotally operated about the axis z of the support shaft 316 between the engaged position ON and the disengaged position OFF. The support member 317 is fixed to a portion of the traveling vehicle body 301. A locking mechanism 318 is provided between the support member 317 and the brake lever 315. The locking mechanism 318 includes ratchet teeth 318a formed on the support member 317 and a pawl (not shown) supported by the brake lever 315. When the brake lever 315 is placed in the engaged position ON, the pawl engages the ratchet teeth 318a to retain the brake lever 315 at the engaged position ON by the locking mechanism 318. By pressing a release button 319 provided at the top of the brake lever 315, the locking mechanism 318 can be released or disengaged so that the brake lever 315 can be returned to the disengaged position OFF.

As shown in FIG. 21, the interlocking mechanism 314 includes a first interlocking member 320, a second interlocking member 330, a coil spring 340, an interlocking member 341 and an actuation cable 342.

The actuation cable 342 includes an inner cable 342a whose brake-lever end is connected to the brake lever 315 via a connector 343 and a connection link 344. The connection link 344 and the brake lever 315 are connected via a connection pin 345 to be rotatable relative to each other. The connection link 344 and the connector 343 are connected via a connection pin 346 to be rotatable relative to each other. The brake end of the inner cable 342a is connected to an input-side free end 341a of the interlocking mechanism 314 via a connector 347.

The interlocking member 341 is connected to the control portion 312a of the parking brake 312 not to permit their relative rotation. The interlocking member 341 is pivotable about the axis (y) of the control portion 312a such that, upon being pivotally operated, the interlocking member 341 can rotate the control portion 312a.

Figure 22:
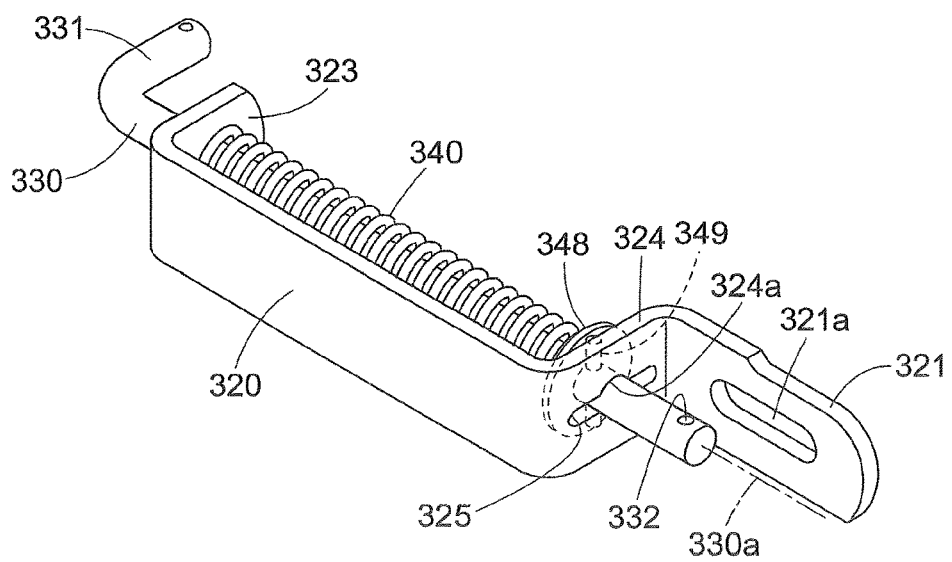

As shown in FIG. 22, a connecting portion 321 with an elongated connection hole 321a is formed on the differential lock device end of the first interlocking member 320. As shown in FIG. 21, secured to the control portion 311a of the differential lock device 311 is a connection pin 322 one end of which is slidably and rotatably inserted in the connection hole 321a. The differential lock device end of the first interlocking member 320 is interlockably connected to the control portion 311a via the connection pin 322.

As shown in FIG. 22, a connector 331 is provided at the brake lever end of the second interlocking member 330. The connector 331 is formed by a bend at the brake lever end of the second interlocking member 330. The connector 331 is inserted into a connection hole formed at the output-side free end 341b of the interlocking member 341 such that the connector 331 and the output-side free end 341b are connected to be rotatable relative to each other. The brake-lever end of the second interlocking member 330 is interlockably connected to the brake lever 315 via the interlocking member 341, the connector 347, the inner cable 342a, the connector 343 and the connection link 344.

Figure 23:
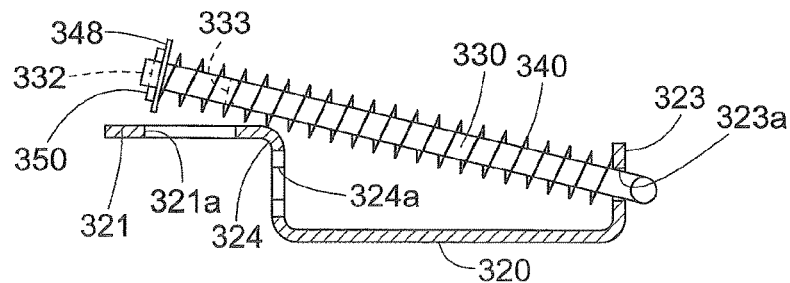

As shown in FIG. 22, a first support portion 323 and a second support portion 324 are formed on the first interlocking member 320. The first support portion 323 and the second support portion 324 are spaced apart from each other along the axis 330a of the second interlocking member 330. As shown in FIGS. 22 and 23, a first support hole 323a is formed in the first support portion 323, and a second support hole 324a is formed in the second support portion 324. The second interlocking member 330 is fitted to extend between the first support hole 323a and the second support hole 324a. Of the brake-lever end of the second interlocking member 330, the portion closer to the differential lock device end than the connector 331 is slidably supported in the first support hole 323a, and the differential lock device end of the second interlocking member 330 is slidably supported in the second support hole 324a.

As shown in FIG. 22, the coil spring 340 is disposed between the first support portion 323 and the second support portion 324 and movably fitted on the second interlocking member 330. The coil spring 340 is fitted on the second interlocking member 330 while being elastically deformed under compression. A spring bearing 348 is slidably attached to the portion of the second interlocking member 330 between the second support portion 324 and the coil spring 340. A support pin 349 is detachably attached to the portion of the second interlocking member 330 between the spring bearing 348 and the second support portion 324. The support pin 349 is adapted to bear the spring bearing 348 by withstanding the pressure generated by the elastic restoring force of the coil spring 340. The spring bearing 348 is positioned by the support pin 349 in such a manner that even when the brake lever 315 is placed in the disengaged position OFF, the spring bearing 348 can be placed in an operating position in which the coil spring 340 remains elastically deformed.

When the brake lever 315 is pivotally operated from the disengaged position OFF to the engaged position ON, the operating force is transmitted to the control portion 312a via the connection link 344, the connector 343, the inner cable 342a, the connector 347, and the interlocking member 341 to rotate the control portion 312a. Concurrently, the operating force transmitted to the interlocking member 341 from the brake lever 315 is transmitted to the second interlocking member 330, which compresses the coil spring 340 via the support pin 349 and the spring bearing 348. This causes the coil spring 340 to transmit the operating force of the second interlocking member 330 to the first interlocking member 320. As the operating force is further transmitted to the control portion 311a from the first interlocking member 320, the control portion 311a is pivotally operated to the engaged position ON, thus switching the differential lock device 311 to the engaged condition.

By further pivotally operating the brake lever 315 toward the engaged position ON after the differential lock device 311 is switched to the engaged condition, the operating force from the brake lever 315 is transmitted by the interlocking member 341 to the control portion 312a and rotate the control portion 312a. When the brake lever 315 is placed in the engaged position ON, the control portion 312a is also placed in the engaged position ON, placing the brake lever 315 in the engaged condition.

While the control portion 311a of the differential lock device 311 has already reached the end of stroke (engaged position) at this moment, the operating force transmitted to the second interlocking member 330 from the brake lever 315 slides the second interlocking member 330 relative to the first interlocking member 320 in the direction opposite to the second support portion 324, so that the coil spring 340 is compressed and elastically deformed by the second interlocking member 330 via the spring bearing 348 and the support pin 349. In particular, the difference between the actuation stroke of the control portion 311a to switch the control portion 311a from the disengaged position OFF to the engaged position ON and the operation stroke of the brake lever 315 to switch the brake lever 315 from the disengaged position OFF to the engaged position ON is absorbed by the elastic deformation of the coil spring 340. This makes it possible to switch the parking brake 312 to the engaged condition without damaging the control portion 311a or the interlocking mechanism 314.

Figure 25:
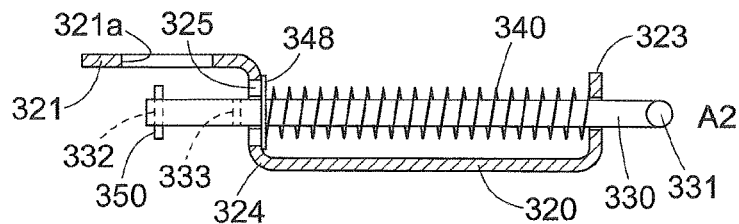

As shown in FIGS. 23 and 25, a pinhole 332 is provided in the differential lock device end of the second interlocking member 330 closer to the differential lock device than the support pin 349. As shown in FIG. 22, formed in the second support portion 324 is an elongated through hole 325 that traverses the second support hole 324a. As shown in FIG. 22, the second interlocking member 330 is rotatably supported by the first support hole 323a and the second support hole 324a and can be rotatably operated between a rotational operation position A1 (see FIG. 27) and a rotational assembly position A2 (see FIG. 26). When the second interlocking member 330 is rotated to the rotational operation position A1, the support pin 349 assumes a position in which the support pin 349 is oriented orthogonally to the through hole 325 to prevent it from passing the through hole 325. When the second interlocking member 330 is rotated to the rotational operation position A2, the support pin 349 assumes a position in which the support pin 349 is oriented in parallel to the elongation of the through hole 325 to allow it to pass the through hole 325.

In view of the above, by assembling the coil spring 340 to the interlocking mechanism 314 by following the assembly procedure shown in FIGS. 23 to 27, the second interlocking member 330 can be used as a jig to assemble and hold the coil spring 340 in an elastically deformed state.

More particularly, as shown in FIG. 23, the operating device-end of the second interlocking member 330 is fitted in the first support hole 323a so as to be supported by the first support portion 323 while leaving the operated device-end of the second interlocking member 330 disengaged from the second support portion 324. The coil spring 340 and the spring bearing 348 are fitted on the second interlocking member 330 in this state and a temporary support pin 350 is inserted in the pinhole 332 so that one end of the coil spring 340 is born by the spring bearing 348 and the other end of the coil spring 340 is born by the first support portion 323. At the same time, the spring bearing 348 is born by the temporary support pin 350 in an assembly position against the restoring force of the coil spring 340 so that the coil spring 340 is supported by the second interlocking member 330 in a weakly elastically deformed state.

Figure 24:
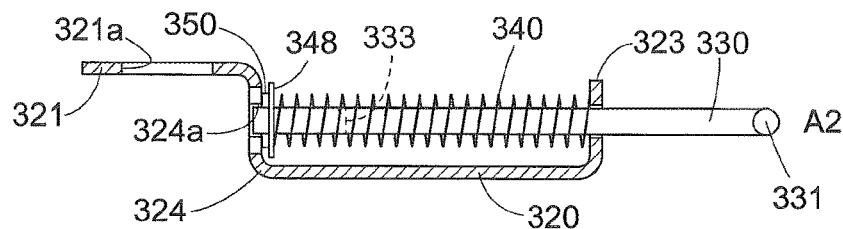
Figure 26:
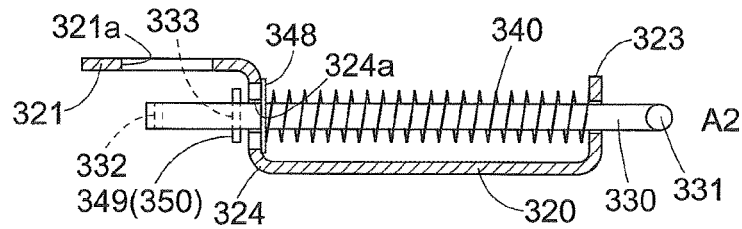

Next, as shown in FIG. 24, the spring bearing 348 is moved toward the first support portion 323 by pulling the second interlocking member 330 toward the first support portion 323, compressing and elastically deforming the coil spring 340 via the spring bearing 348 against the first support portion 323. At the same time, the operated device-end of the second interlocking member 330 is set on the inside surface of the second support portion 324 so that the second support portion 324 can bear the spring bearing 348. In this state, the operated device-end of the second interlocking member 330 is aligned with the second support hole 324a and the second interlocking member 330 is adjusted to the rotational assembly position A2. As shown in FIG. 25, when the temporary support pin 350 is set in a position to pass the through hole 325, the second interlocking member 330 is pushed toward the second support portion until the temporary support pin 350 passes the through hole 325 out of the second support portion 324 and the pinhole 333 comes outside of the second support portion 324. As shown in FIG. 26, once the temporary support pin 350 and the pinhole 333 come outside of the second support portion 324, the temporary support pin 350 is removed and fitted in the pinhole 333 as the support pin 349. While the same pin is used as the temporary support pin 350 and the support pin 349 in this embodiment, separate pins may be used as the temporary support pin 350 and the support pin 349.

Figure 27:
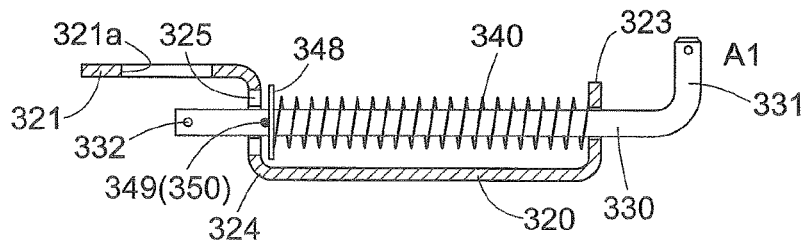

Subsequently, as shown in FIG. 27, the second interlocking member 330 is pulled back toward the first support portion until the support pin 349 passes the through-hole 325 to come inside of the second support portion 324. Once the support pin 349 comes inside of the second support portion 324, the second interlocking member 330 is rotated from the rotational assembly position A2 to the rotational operation position A1. Then, despite being pressured by the elastic restoring force of the coil spring 340, the support pin 349 is born by the second support portion 324 and thus prevented from passing the through hole 325. This brings the support pin 349 into abutment with the second support portion 324 to interpose the coil spring 340 between the first support portion 323 and the spring bearing 348. This in turn strongly elastically deforms the coil spring 340 under compression so as to be incorporated in the interlocking mechanism 314 while keeping the coil spring 340 elastically deformed and interposed between the first interlocking member 320 and the second interlocking member 330.

In this embodiment, the coil spring 340 is configured to be weakly elastically deformed under compression with the spring bearing 348 set in the assembly position. However, the present invention is not so limited. Rather, once the spring bearing 348 is in the assembly position, the coil spring 340 may also be configured to be in a free condition where it is not elastically deformed. In that case, in the final step of the procedure, in which the spring bearing 348 is positioned by the support pin 349, the coil spring 340 may be configured to be elastically deformed so that it can be assembled to the interlocking mechanism 314.

Modified Embodiments of the Fourth Embodiment

The following describes only the differences from the foregoing embodiment:

(1) In the foregoing embodiment, while the differential lock device 311 and the parking brake 312 are configured to be operated with the same brake lever 315, the differential lock device 311 and the parking brake 312 may also be operated by separate operation levers.

(2) In the foregoing embodiment, while the connector 331 of the second interlocking member 330 is formed by a bend, the connector 331 may also be linearly connected with its associated parts.

(3) In the foregoing embodiment, while a lever is used for operation, a pedal may be used instead of the lever. The lever and the pedal are referred to as operating devices herein.

(4) While the same pin is used as the temporary support pin 350 and the support pin 349 in this embodiment, the temporary support pin 350 and the support pin 349 may be separate pins.

(5) In the foregoing embodiment, while the operated devices are the differential lock device 311 and the parking brake 312, the present invention is not so limited. The operated devices may additionally or alternatively be different devices, such a winch brake. Moreover, the work vehicle to which the present invention can be applied is not limited to a utility vehicle as in the foregoing embodiment. Rather, the present invention may equally be applied to other types of work vehicles, such as tractors, combine-harvesters, and rice transplanters.

What is claimed is:

1. A work vehicle, comprising:
a body frame;
an engine;
an exhaust muffler associated with the engine;
a support structure provided in the body frame for supporting the engine; and
an elastic support mechanism interposed between the support structure and the exhaust muffler for supporting the exhaust muffler on the support structure, the elastic support mechanism including:
a support platform member supported by the support structure, the support platform member being configured to adjust a position of the support platform member along one of lateral and longitudinal directions of the body frame,
an elastic cylindrical member supported by one of the support platform member and the exhaust muffler, the elastic cylindrical member having an axis extending along the other of the lateral and longitudinal directions, and the elastic cylindrical member being supported at a single position, in a direction of said axis, of said one of the support platform member and the exhaust muffler, wherein a longitudinal axis of the elastic cylindrical member extends substantially parallel to a longitudinal axis of an adjusting member that is provided to permit adjustment of the position of the support platform member, and
a bar-shaped member supported by the other of the support platform member and the exhaust muffler, the bar-shaped member being fitted into the elastic cylindrical member to be supported by the elastic cylindrical member.

2. The work vehicle according to claim 1, wherein
the elastic cylindrical member is supported by the support platform member, and
the bar-shaped member is supported by the exhaust muffler.

3. The work vehicle according to claim 1, wherein
a pair of the elastic cylindrical members are arranged side by side in said one of the lateral and longitudinal directions, and
a pair of the bar-shaped members are inserted and fitted into the respective elastic cylindrical members in the same direction as each other.

4. The work vehicle according to claim 1, further comprising:
a travel mechanism;
an exhaust pipe connecting the engine and the exhaust muffler; and
a transmission for transmitting power of the engine to the travel mechanism,
wherein the body frame includes a first body frame section and a second body frame section detachably attached to the first body frame section, the second body frame section supporting the engine, the exhaust pipe and the transmission, and
wherein the support structure forms the second body frame section.

* * * * *